United States Patent
Lan

(10) Patent No.: US 9,900,183 B2
(45) Date of Patent: Feb. 20, 2018

(54) IP ADDRESS AUTOMATIC ASSIGNMENT METHOD, DEVICE, AND SYSTEM

(75) Inventor: Haiqing Lan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1408 days.

(21) Appl. No.: 13/416,661

(22) Filed: Mar. 9, 2012

(65) Prior Publication Data
US 2012/0173646 A1    Jul. 5, 2012

Related U.S. Application Data

(63) Continuation of application No. PCT/CN2010/076796, filed on Sep. 10, 2010.

(30) Foreign Application Priority Data

Sep. 11, 2009   (CN) .......................... 2009 1 0170885
Dec. 31, 2009   (CN) .......................... 2009 1 0215385

(51) Int. Cl.
G06F 15/16   (2006.01)
H04L 12/54   (2013.01)
H04L 29/12   (2006.01)
H04L 29/08   (2006.01)

(52) U.S. Cl.
CPC .......... H04L 12/56 (2013.01); H04L 61/2015 (2013.01); H04L 67/1095 (2013.01)

(58) Field of Classification Search
CPC ................................................. H04L 67/1095
See application file for complete search history.

(56) References Cited

U.S. PATENT DOCUMENTS

| | | | | |
|---|---|---|---|---|
| 6,493,340 | B1* | 12/2002 | Kawanaka | ........ H04L 29/12264 370/389 |
| 7,624,164 | B2* | 11/2009 | Lu | ..................... H04L 29/12028 709/220 |
| 8,571,022 | B1* | 10/2013 | Jintaseranee | ....... H04L 65/1069 370/389 |
| 2001/0054101 | A1* | 12/2001 | Wilson | .................... H04L 12/14 709/225 |
| 2003/0236865 | A1 | 12/2003 | Anthe et al. | |
| 2004/0230703 | A1 | 11/2004 | Sukigara | |

(Continued)

FOREIGN PATENT DOCUMENTS

| CN | 1391173 A | 1/2003 |
|---|---|---|
| CN | 1410895 A | 4/2003 |

(Continued)

OTHER PUBLICATIONS

Thomson, S. et al., "IPv6 Stateless Address Autoconfiguration," Network Working Group, Sep. 2007, 30 pages.

(Continued)

*Primary Examiner* — Dhairya A Patel
(74) *Attorney, Agent, or Firm* — Slater Matsil, LLP

(57) ABSTRACT

The present invention relates to an IP address automatic assignment method, a client, and a server. The present invention solves the technical problem in the prior art that a DHCP Relay host needs to be added additionally to assign an IP address to a client when a DHCP server and the client are not on the same network segment, thereby saving configuration cost and simplifying network configuration.

20 Claims, 27 Drawing Sheets

(56) References Cited

U.S. PATENT DOCUMENTS

| | | | |
|---|---|---|---|
| 2005/0097223 A1* | 5/2005 | Shen | H04L 29/12283 709/245 |
| 2005/0114492 A1 | 5/2005 | Arberg et al. | |
| 2006/0034297 A1* | 2/2006 | O'Neill | H04L 12/4641 370/395.53 |
| 2007/0180142 A1* | 8/2007 | Small | H04L 12/14 709/245 |
| 2008/0130647 A1 | 6/2008 | Ohba et al. | |
| 2008/0222275 A1* | 9/2008 | Yumoto | H04L 12/433 709/220 |
| 2010/0037054 A1 | 2/2010 | Zhao | |
| 2011/0145377 A1* | 6/2011 | Ringen | H04L 29/12066 709/222 |

FOREIGN PATENT DOCUMENTS

| | | |
|---|---|---|
| CN | 1567824 A | 1/2005 |
| CN | 1845554 A | 10/2006 |
| CN | 1949784 A | 4/2007 |
| CN | 101247356 A | 8/2008 |
| CN | 101287017 A | 10/2008 |
| CN | 101656763 A | 2/2010 |
| CN | 101656763 B | 3/2013 |
| KR | 20060039999 A | 1/2003 |

OTHER PUBLICATIONS

Search Report received in Chinese Application No. 2009102153852 dated Aug. 28, 2012, 2 pages.

Extended European Search Report received in Application No. 10815008.7-2416, Applicant: Huawei Technologies Co., Ltd., dated Jan. 30, 2013, 12 pages.

First Chinese Office Action and Translation received in Chinese Patent Application No. 200910170885.9, dated Apr. 14, 2011, 12 pages.

International Search Report and Translation received in Patent Cooperation Treaty Application No. PCT/CN2010/076796, dated Dec. 23, 2010, 6 pages.

Written Opinion of the International Searching Authority and Translation received in Patent Cooperation Treaty Application No. PCT/CN2010/076796, dated Dec. 23, 2010, 12 pages.

Droms, R., "Dynamic Host Configuration Protocol," Network Working Group, Request for Comments: 2131, Mar. 1997, 45 pages.

* cited by examiner

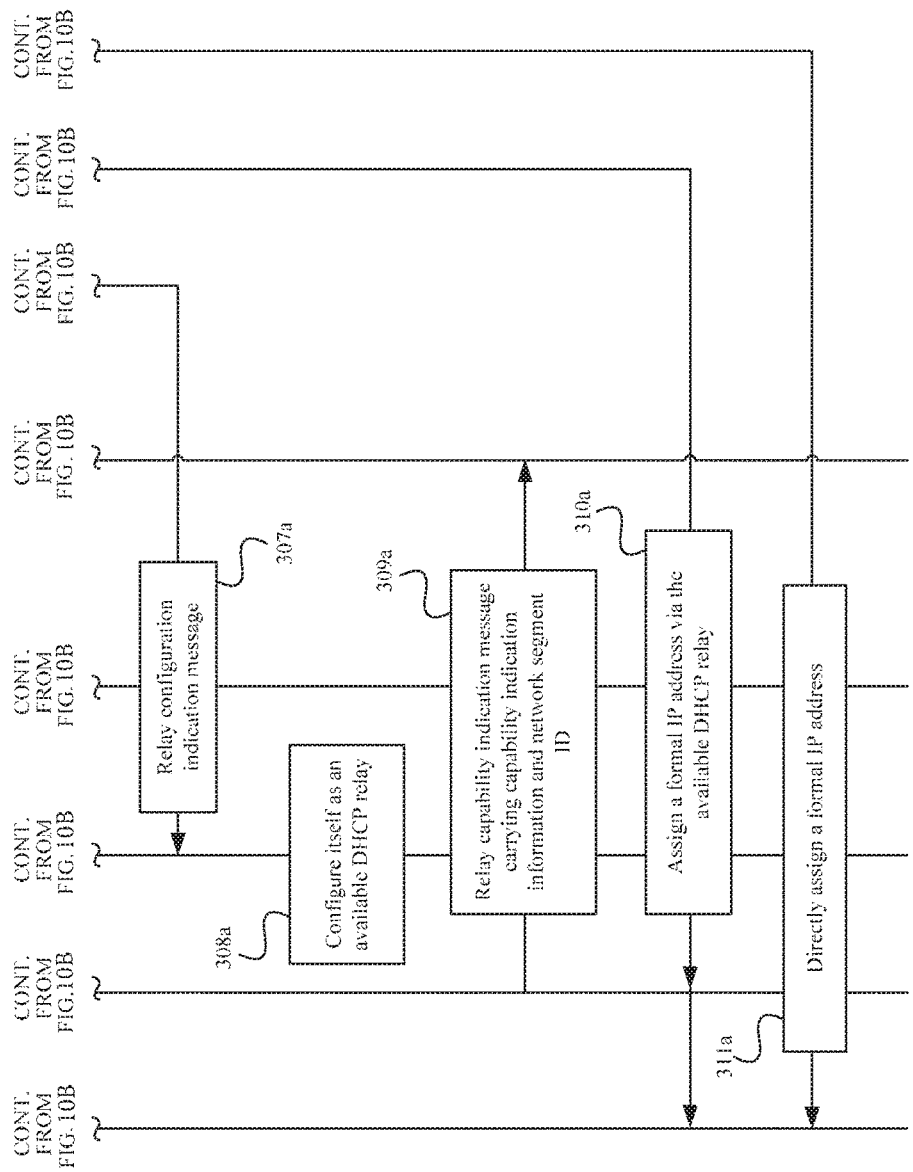

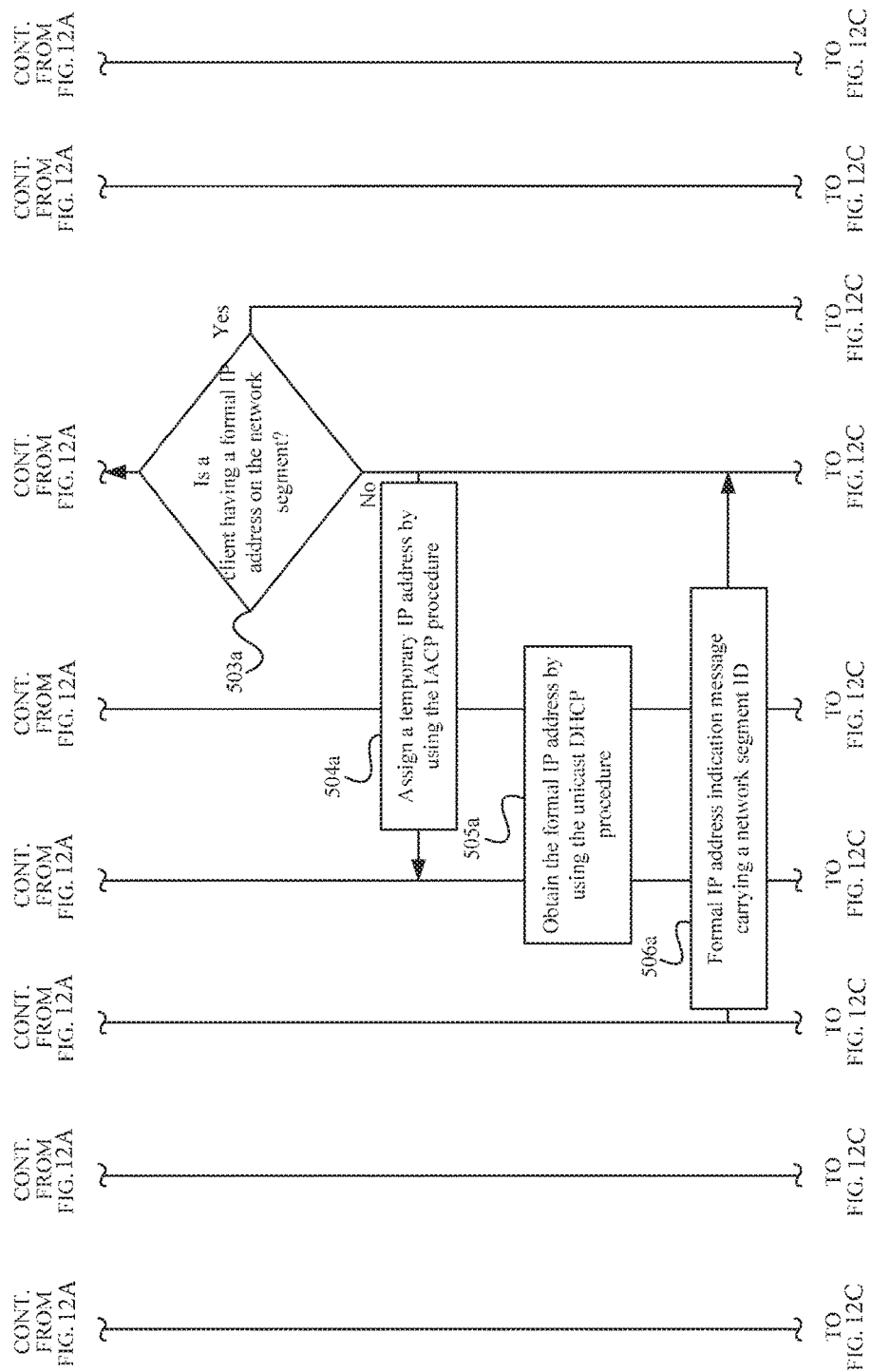

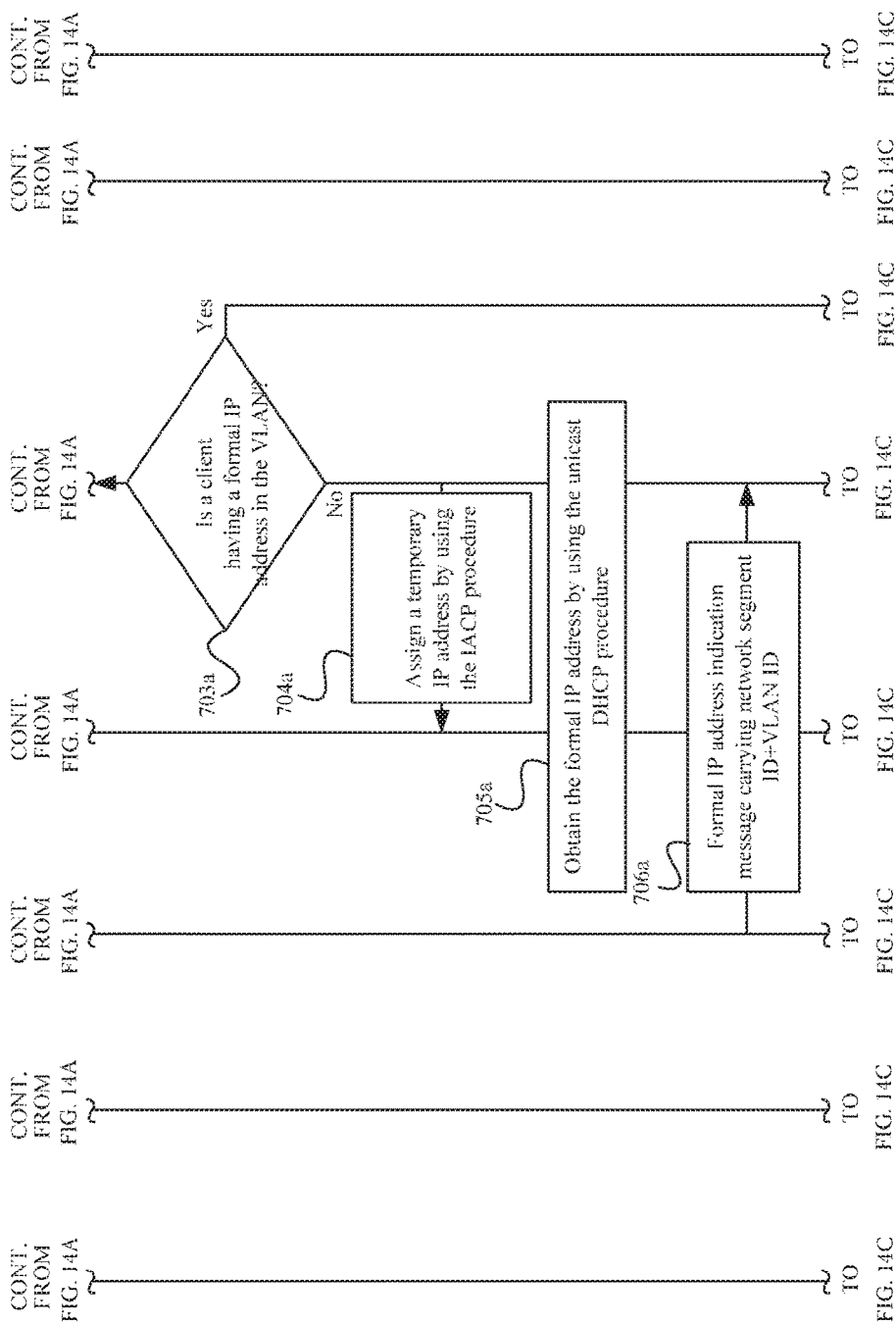

IP ADDRESS AUTOMATIC ASSIGNMENT
METHOD, DEVICE, AND SYSTEM

CROSS-REFERENCE TO RELATED
APPLICATIONS

This application is a continuation of International Application No. PCT/CN2010/076796, filed on Sep. 10, 2010, which claims priority to Chinese Patent Application No. 200910170885.9, filed on Sep. 11, 2009 and Chinese Patent Application No. 200910215385.2, filed on Dec. 31, 2009, all of which are hereby incorporated by reference in their entireties.

FIELD OF THE INVENTION

The present invention relates to the field of network technologies, and in particular, to an IP address automatic assignment method, client, and server.

BACKGROUND OF THE INVENTION

An Internet Protocol (Internet Protocol, IP) address is an identifier for identifying a user equipment or a network device, and is also an identifier used for IP packet forwarding in an IP network. Therefore, IP address assignment is essential to the entire IP network.

At present, the mode for assigning an IP address includes automatically obtaining an IP address. The mode for automatically obtaining an IP address is: a client may automatically obtain a host IP address, a gateway IP address, and a subnet mask on the network segment of the client, without human intervention. At present, the mainstream technology for automatically obtaining an IP address is the Dynamic Host Configuration Protocol (DHCP: Dynamic Host Configuration Protocol). In the technology, a DHCP server manages all IP network configuration data in a centralized manner, and is responsible for processing a DHCP request from the client. The client uses the IP configuration data assigned from the DHCP server.

During the implementation of the present invention, the inventor finds that the defect of automatically obtaining an IP address in the prior art is that: When a DHCP server and a client are not on the same network segment, a DHCP relay host needs to be configured on the same network segment of the client. The DHCP relay host receives a DHCP request from the client, sends the DHCP request to the DHCP server, and sends a response from the DHCP server to the client. However, generally, only a routing function is provided for a standard service of an IP network and an IP address automatic configuration function is not provided. The DHCP relay host function belongs to the IP address automatic configuration function rather than the routing function. Therefore, generally, the operator of a bearer network does not provide a DHCP Relay function. Since the operator of the bearer network does not provide the DHCP Relay function, IP address automatic configuration is difficult to be implemented when the IP network provides a standard service.

SUMMARY OF THE INVENTION

To solve the problem in the prior art, embodiments of the present invention provide an IP address automatic assignment method, a client, and a server, which can implement IP address automatic assignment with high efficiency and low cost.

An embodiment of the present invention provides an IP address automatic assignment method, including: obtaining, by a client, an IP packet containing an unassigned IP address; probing, by the client, into whether the unassigned IP address in the obtained IP packet is occupied; and if the unassigned IP address is not occupied, determining whether the client is allowed to obtain the unassigned IP address; if the client is allowed to obtain the unassigned IP address, obtaining, by the client, the unassigned IP address.

An embodiment of the present invention provides an IP address client, including: an IP packet obtaining unit, configured to obtain an IP packet containing an unassigned IP address; an IP address probing unit, configured to probe into whether the unassigned IP address in the IP packet obtained by the IP packet obtaining unit is occupied; and a determining unit, configured to determine whether the client is allowed to obtain the unassigned IP address, when the IP address probing unit probes that the unassigned IP address is not occupied.

An embodiment of the present invention provides an IP address automatic assignment method, including: generating, by an IP address assignment server, an IP packet containing an unassigned IP address; sending, by the IP address assignment server, the IP packet to a network segment where the unassigned IP address is located, where a client to which an IP address is not assigned exists on the network segment; and receiving, by the IP address assignment server, an acknowledge message indicating that the unassigned IP address is assigned.

An embodiment of the present invention further provides an IP address assignment server, including: an IP packet generating unit, configured to generate an IP packet containing an unassigned IP address; an IP packet sending unit, configured to send the IP packet generated by the packet generating unit to a network segment where the unassigned IP address is located, where a client to which an IP address is not assigned exists on the network segment; and an acknowledge message receiving unit, configured to receive an acknowledge message indicating that the unassigned IP address is assigned.

According to the technique used in embodiments of the present invention, an IP Address Auto Configuration Protocol (IACP) server is used to actively send an unassigned IP address, and a client actively obtains the unassigned IP address, thereby solving the problem in the prior art that a DHCP Relay host needs to be added additionally to assign an IP address to a client when a DHCP server and a client are not on the same network segment, saving the configuration cost and simplifying network configuration.

In another aspect:

Embodiments of the present invention provide an IP address automatic configuration method, a server, a client, and a communication system to solve the problem in the prior art that the dedicated DHCP relay requires to be set with high investment and high maintenance cost.

An embodiment of the present invention provides an IP address automatic configuration method, including: determining, by a server, a client having a formal IP address which is a configured IP address, within a communication range to which a client to be configured with a formal IP address belongs; sending, by the server, a relay configuration indication message to the client having the formal IP address, where the relay configuration indication message carries dynamic host configuration protocol DHCP configuration information; and after configuring, by the client having the formal IP address, itself as a DHCP relay according to the DHCP configuration information, assigning, by the server, a formal IP address to the client that is to be configured with the formal IP address, through the client that is configured as the DHCP relay.

An embodiment of the present invention provides an IP address automatic configuration method, including: receiving, by a client having a formal IP address, a relay configuration indication message sent by a server, where the relay configuration indication message carries dynamic host configuration protocol DHCP configuration information, and the client having the formal IP address and a client to be configured with a formal IP address are within the same communication range; configuring, by the client having the formal IP address, itself as a DHCP relay according to the DHCP configuration information; and providing, by the client configured as the DHCP delay, a DHCP relay function, and implementing that a formal IP address is assigned by the server to the client to be configured with the formal IP address.

An embodiment of the present invention provides a server, including: a client determining module, configured to determine a client having a formal IP address which is a configured IP address, within a communication range to which a client to be configured with a formal IP address belongs; a sending module, configured to send a relay configuration indication message to the client having the formal IP address, where the relay configuration indication message carries dynamic host configuration protocol DHCP configuration information; and an assigning module, configured to, after the client having the formal IP address configures itself as a DHCP relay according to the DHCP configuration information, assign a formal IP address to the client to be configured with the formal IP address, through the client that is configured as the DHCP relay.

An embodiment of the present invention provides a client, including: a receiving module, configured to receive a relay configuration indication message sent by a server, where the relay configuration indication message carries dynamic host configuration protocol DHCP configuration information; a configuring module, configured to configure the client as a DHCP relay according to the DHCP configuration information; and a relaying module, configured to provide a DHCP relay function and implement that a formal IP address is assigned by the server to a client to be configured with a formal IP address.

An embodiment of the present invention provides a communication system, including the above server and client.

According to the embodiments of the present invention, a client having a formal IP address is configured as a DHCP relay; when DHCP is used to configure an IP address, a dedicated DHCP relay is not required to be set in a network system, thereby reducing the network investment and maintenance cost.

BRIEF DESCRIPTION OF THE DRAWINGS

The accompanying drawings described herein facilitate further understanding of the embodiments of the present invention and constitute a part of the application but do not limit the embodiments of the present invention. Among the drawings:

FIG. 10A, FIG. 10B, and FIG. 10C are a schematic flowchart of a method according to an embodiment of the present invention;

FIG. 12A, FIG. 12B, and FIG. 12C are a schematic flowchart of a method according to an embodiment of the present invention;

FIG. 14A, FIG. 14B, and FIG. 14C are a schematic flowchart of a method according to an embodiment of the present invention;

DETAILED DESCRIPTION OF THE EMBODIMENTS

To make the objectives, technical solutions, and advantages of the embodiments of the present invention clearer, the following describes the embodiments of the present invention with reference to the implementation and the accompanying drawings. Exemplary implementation and description of the embodiments of the present invention are merely for illustrating the embodiments of the present invention, rather than limiting the embodiments of the present invention.

The technology for automatically configuring an IP address according to the embodiments of the present invention may be termed IACP: IP Address Auto Configuration Protocol (Address Auto Configuration Protocol). The protocol may be used to remotely and automatically configure an IP address. A bearer network may be a Layer 3 IP network, and the Layer 3 IP network only needs to be configured with simple route information.

The technical solutions according to embodiments of the present invention may involve three function nodes:

1. IACP client: That is, an IACP client. An IP address is required to be assigned to the node (hereunder referred to as "client"). In other words, the client is a host, for example, a computer, to which an IP address is assigned.

2. IACP server: That is, an IACP server (hereunder referred to as "IP address assignment server"). The node provides an IP address assignment service, including an IP address pool and an IP address assignment policy.

The following describes an IACP address assignment solution from perspectives of the method, involved nodes (referred to as "network element" or "apparatus"), and system.

In addition, the embodiments of the present invention involve several concepts, which are detailed hereunder.

ARP: address resolution protocol Address Resolution Protocol. That is, an Internet protocol for mapping an IP address into an Ethernet MAC address.

ARP request: In an ARP protocol, if a local host learns the IP address of a certain node but does not learn the MAC address of the node, the local host broadcasts an ARP request over Ethernet to query a MAC address corresponding to the IP address.

ARP response: In an ARP protocol, if a local host finds that an IP address in an ARP request is the IP address of the local host, the local host sends an ARP response to a peer host to notify the peer host of a MAC address corresponding to the IP address.

Free ARP request: If a host desires to use a certain IP address as the IP address of the host, but does not learn whether IP address conflict may occur, that is, the host broadcasts a free ARP request of the IP address over Ethernet; and if a response is received, it indicates that IP address conflict occurs; otherwise, it indicates that no IP address conflict occurs.

Free ARP response: If a host desires to use a certain IP address as the IP address of the host and broadcasts the free ARP response over Ethernet to notify an entire Ethernet that the IP address is used by the host.

Embodiment 1

Figure 1:
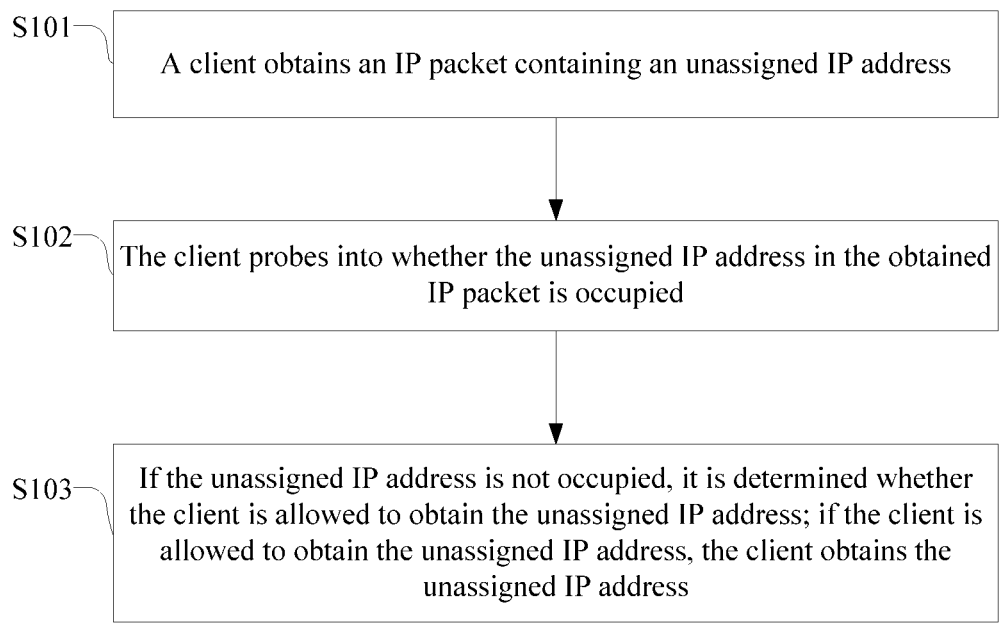
FIG. 1 is a flowchart of an IP address automatic assignment method according to an embodiment of the present invention.

FIG. 1 is a flowchart of an IP address automatic assignment method according to an embodiment of the present invention. As shown in FIG. 1, the method includes the following steps:

S101. A client obtains an IP packet containing an unassigned IP address.

In the embodiment of the present invention, a client to which no IP address is assigned obtains the IP packet, where the IP packet contains one or multiple unassigned IP addresses. The IP packet may be an ARP (Address Resolution Protocol, Address Resolution Protocol) request packet containing an unassigned IP address. The ARP request packet may be sent by an IACP server or an access router on a local network segment. When the client and IACP server are not on the same network segment, the client receives the ARP request packet sent by the access router on the network segment where the client is located; when the client and IACP server are on the same network segment, the client receives the ARP request packet sent by the IACP server. The IACP server or the access router broadcasts the ARP request packet on the local network segment, as detailed in the above description. The ARP request packet may be used to obtain a MAC address corresponding to the unassigned IP address contained in the ARP request packet.

S102. The client probes into whether the unassigned IP address in the obtained IP packet is occupied.

In the embodiment of the present invention, after obtaining the IP packet, the client may broadcast a free ARP request packet containing the unassigned IP address on the local network segment, and probe, according to a response message replied, into whether the obtained unassigned IP address is occupied. Specifically, the client may broadcast the free ARP request packet to another node (for example, another client, a computer on the network segment, an access router, or a server using an IP address on the network segment) on the local network segment, and probe, according to a free ARP response message from another node, into whether the IP address is occupied.

It can be understood that the local network segment in the embodiment of the present invention refers to the network segment where the client is located.

S103. If the unassigned IP address is not occupied, determine whether the client is allowed to obtain the unassigned IP address; if the client is allowed to obtain the unassigned IP address, obtain the unassigned IP address.

In the embodiment of the present invention, if the client does not receive the response message replied by another node, the client considers that the unassigned IP address is not occupied and further determines whether the client is allowed to obtain the unassigned IP address. Specifically, if multiple clients to which no IP address is assigned exist, all the clients to which no IP address is assigned may select a client in election mode to obtain the unassigned IP address. To be specific, it is determined, according to received comparison information carried in the free ARP request packet sent by another client, whether the client is allowed to obtain the unassigned IP address.

In another embodiment of the present invention, after obtaining an unassigned IP address, an elected client broadcasts, to the local network segment, a response message (for example, a free ARP response) indicating that the unassigned IP address is occupied. It can be understood that, in terms of the relationship between clients, it may also be considered that the client that obtains the unassigned IP address broadcasts the free ARP response to another client on the network segment.

In another aspect, the client that obtains the unassigned IP address may also obtain a subnet mask, a gateway IP address, and an IP address of an IACP server on the network segment, and send an acknowledge message, indicating that the unassigned IP address is assigned, to the IACP server according to the obtained IP address of the IACP server.

According to the technique used in the embodiments of the present invention, an IACP server is used to actively send an unassigned IP address, and a client actively obtains the unassigned IP address, thereby solving the problem in the prior art that a DHCP Relay host needs to be added additionally to assign an IP address to a client when a DHCP server and the client are not on the same network segment, saving configuration cost and simplifying network configuration.

The first embodiment describes the solutions of IACP address assignment from the perspective of a client. A second embodiment describes the solutions from the perspective of an IACP server.

Embodiment 2

Figure 2:
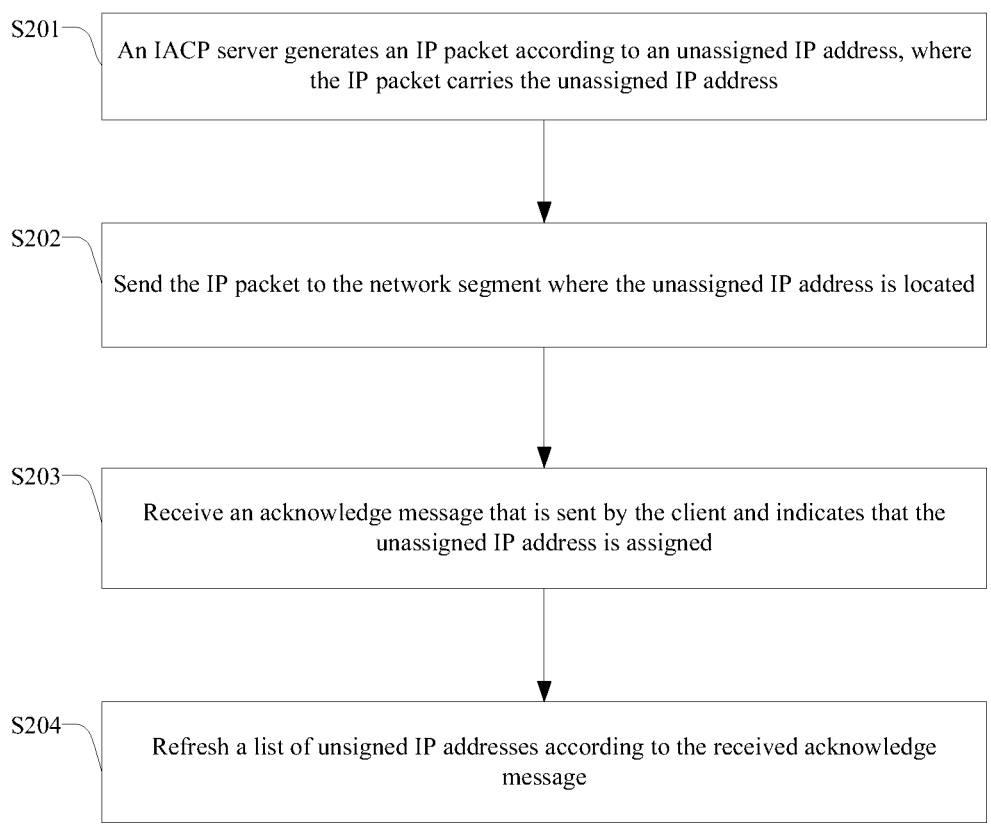
FIG. 2 is a flowchart of an IP address automatic assignment method according to an embodiment of the present invention.

FIG. 2 is a flowchart of an IP address automatic assignment method according to an embodiment of the present invention. As shown in FIG. 2, the method includes the following steps:

S201. An IACP server generates an IP packet according to an unassigned IP address, where the IP packet carries the unassigned IP address.

In the embodiment of the present invention, the IACP server generates the IP packet according to the unassigned IP address (may be represented in the form of an IP address list), where the IP packet contains the unassigned IP address (one or multiple).

It can be understood that an IP packet may be in different forms according to different application scenarios.

If the IACP server and a client are not on the same network segment, the IP packet may be a probe IP packet containing a subnet mask and a gateway IP address on the network segment where the unassigned IP address is located, and the IP address of the IACP server. The client may be understood as a client to which an IP address is required to be assigned, that is, a client to which no IP address is assigned.

If the IACP server and the client are on the same network segment, the IP packet may be an ARP request packet, where the ARP request packet contains the unassigned IP address.

S202. Send the IP packet to the network segment where the unassigned IP address is located.

In the embodiment of the present invention, the IACP server sends the IP packet to the network segment where the unassigned IP address is located. It can be understood that the word "send" here may refer to a periodical sending mode, or an event triggered sending mode. The following mainly uses the periodical sending mode as an example for illustration.

When the IP packet is a probe IP packet, the IACP server periodically sends the probe IP packet to an access router on the network segment where the unassigned IP address is located. Subsequently, the access router generates an ARP request packet according to the probe IP packet, and sends the ARP request packet to a client on the same network segment, where a client to which no IP address is assigned exists on the network segment.

When the IP packet is the ARP request packet, the IACP server periodically sends the ARP request packet to the client on the network segment where the unassigned IP address is located. A client to which no IP address is assigned exists on the network segment.

S203. Receive an acknowledge message that is sent by the client and indicates that the unassigned IP address is assigned.

In the embodiment of the present invention, after the unassigned IP address is assigned to a client, the client may notify, through the acknowledge message, the IACP server that the IP address is assigned, that is, the IACP server receives the acknowledge message that is sent by the client and indicates that the unassigned IP address is assigned.

Optionally, in the embodiment of the present invention, the method for automatically assigning an IP address may include step S204: Refresh the list of unassigned IP addresses according to the received acknowledge message.

Specifically, in the embodiment of the present invention, if the IP packet generated by the IACP server in step S201 only includes one IP address, after the IP address is assigned, the IACP server stops sending the IP packet, which contains the IP address, according to the received acknowledge message and refreshes the list of unassigned IP addresses, and performs step 201 again according to the refreshed list of unassigned IP addresses to generate a new IP packet.

If the IP packet generated by the IACP server in step S201 includes multiple IP addresses, after one of the IP addresses is assigned, the IACP server refreshes the list of unassigned IP addresses according to the received acknowledge message, and performs step 201 again according to the refreshed list of unassigned IP addresses to generate a new IP packet.

According to the technique used in the embodiment of the present invention, an IACP server actively sends an unassigned IP address and a client actively obtains the unassigned IP address, thereby solving the problem in the prior art that a DHCP Relay host needs to be added additionally to assign an IP address to a client when a DHCP server and the client are not on the same network segment, saving configuration cost and simplifying the network configuration.

Embodiment 3

Figure 3A:
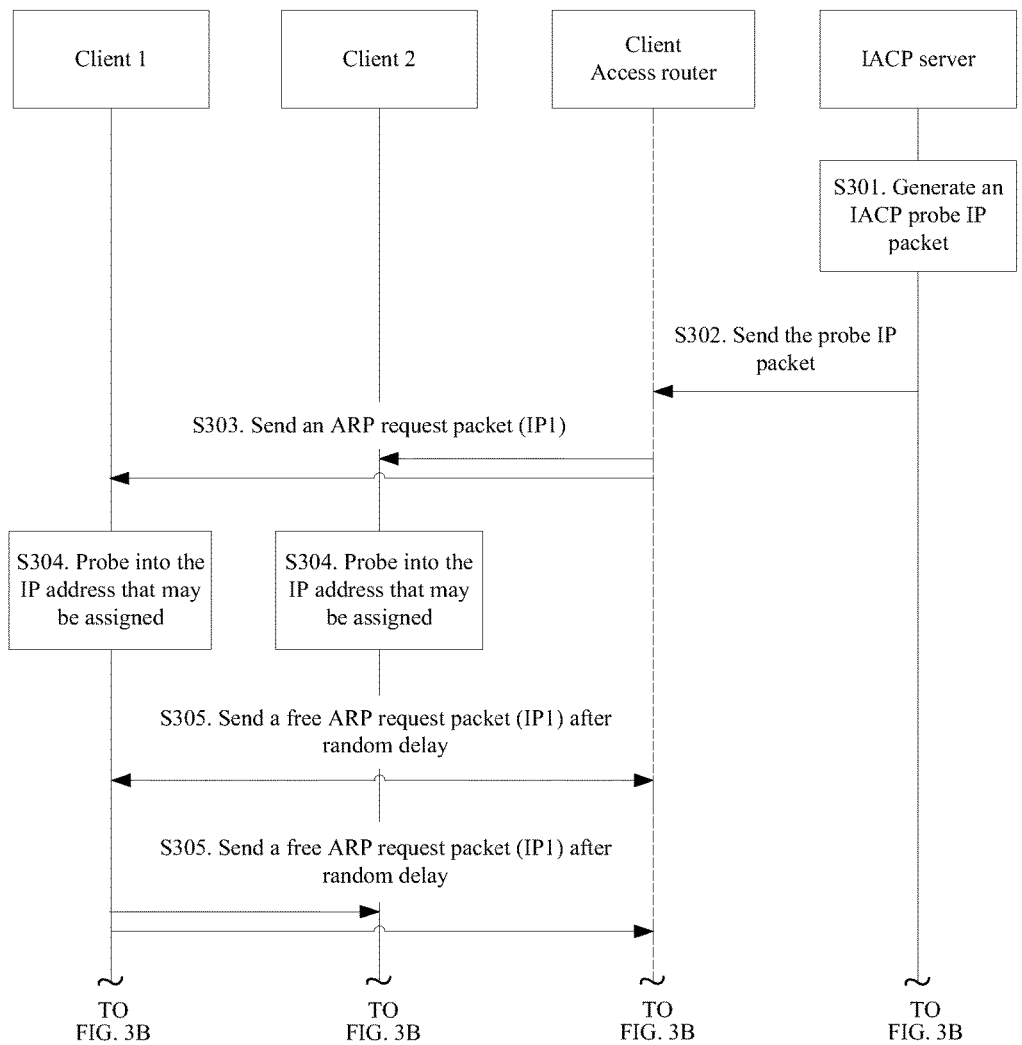
FIG. 3A and FIG. 3B are a signaling diagram of an IP address automatic assignment method according to an embodiment of the present invention.
Figure 3B:
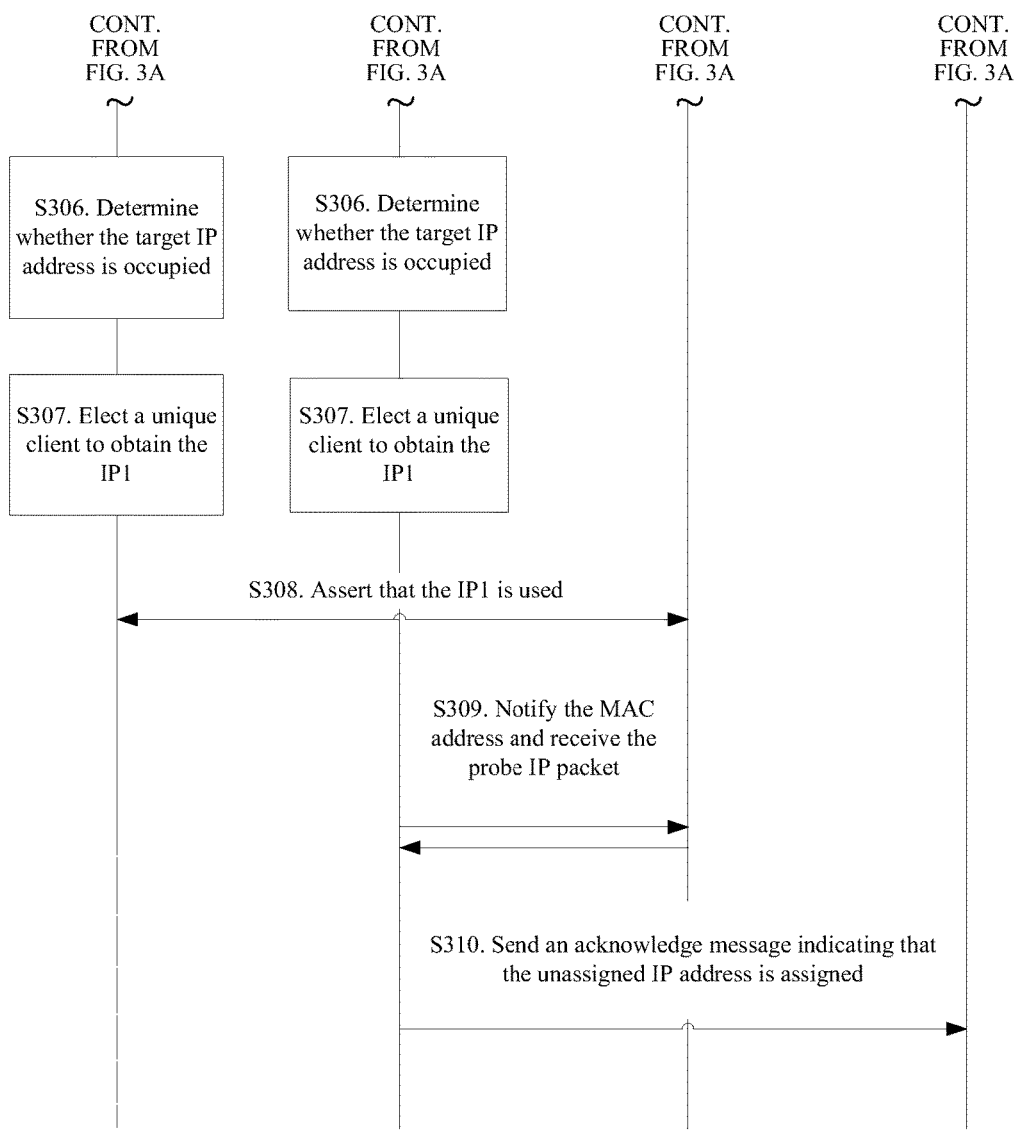

FIG. 3A and FIG. 3B are a signaling diagram of an IP address automatic assignment method according to an embodiment of the present invention. In FIG. 3A and FIG. 3B, an IP address needs to be assigned to a client, and an IACP server provides the service of assigning the IP address. In the embodiment, it is assumed that the IACP server and the client are not on the same network segment, as shown in FIG. 3A and FIG. 3B, the method includes the following steps:

S301. An IACP server generates a probe IP packet according to an unassigned IP address, where the probe IP packet carries the unassigned IP address and route information.

In the embodiment of the present invention, when the IACP server finds that a planned IP address is not assigned, it is assumed that the IP address is IP1, the IACP server uses IP1 as a destination IP address, and uses the IP address of the IACP server as a source IP address to generate the probe IP packet. The IP packet may carry the length of a subnet mask on the network segment where IP1 is located, a gateway IP address (it is assumed that the gateway IP address is IP0) on the network segment where IP1 is located, and other optional information. The identifier of the probe IP packet is a probe IP packet (IP1). When a certain client obtains IP1, the client may generate route information by using the length of the subnet mask and the gateway IP address when the client sends an IP packet.

S302. The IACP server sends the probe IP packet to an access router of a target client.

In the embodiment of the present invention, the target client refers to a client on the network segment where an unassigned IP address IP1 is located.

The IACP server sends the probe IP packet to the network segment where the unassigned IP address is located. In the embodiment of the present invention, the probe IP packet (IP1) is a unicast IP packet and a bearer network is a Layer 3 network. The probe IP packet (IP1) may be sent to an access router on the network segment where the IP1 is located, and the access router may also be the access router of a certain client, and it is assumed that the access router is Router 1.

It can be understood that the word "send" here may refer to a periodical sending mode, or an event triggered sending mode. The following mainly uses the periodical sending mode as an example for illustration.

The IACP server repeatedly sends the probe IP packet (IP1) with a certain period T1. The sending stops until a certain client feeds back completion of IP1 assignment. T1 is a configurable time parameter, and it is assumed that T1 here is 5 s.

S303. The access router of the target client broadcasts the ARP request packet containing the target IP address to an entire destination network segment.

IP1 is an unassigned IP address. The access router Router 1 learns which network segment of the router the IP1 is on, but does not learn an Ethernet MAC address corresponding to the IP1. Therefore, Router 1 may broadcast an ARP request packet on the network segment where the IP1 is located, where the ARP request packet may be used to query a MAC address corresponding to the IP1. The ARP request packet here is identified as an ARP request packet (IP1). Any client on the network segment where the IP1 is located can receive the ARP request packet (IP1).

S304. The client receives the ARP request packet, and uses the packet to probe into an IP address that may be assigned.

In the embodiment of the present invention, when no IP address is assigned to clients 1 and 2, the clients 1 and 2 use the received ARP request packet on the network to probe into the IP address that may be assigned. To enhance system stability, the client at this stage processes only the ARP request packet, but does not process a free ARP request packet, an ARP response packet, and a free ARP response packet.

It is assumed that the clients 1 and 2 receive a certain ARP request packet, and detect that the ARP request packet is intended to query the Ethernet MAC address of the IP address IP1. The ARP request packet may be referred to as the ARP request packet (IP1), and the clients 1 and 2 consider that the IP1 may be the IP address assigned by the IACP server to the clients 1 and 2, so that the clients 1 and 2 are ready to preempt the IP address. It can be understood that if no IP address is assigned to multiple clients on the network segment, and the multiple clients receive the ARP request packet, then on the network segment, all clients to which no IP address is assigned may preempt the IP address.

S305. The client sends a probe message containing an unassigned IP address, for example, a free ARP request packet.

In the step, the client probes into whether the target IP address is occupied, by sending the free ARP request packet.

In the embodiment of the present invention, after receiving the ARP request packet (IP1), the clients 1 and 2 may send the free ARP request packet containing the IP1 on the network segment after random delay, for example, random delay between T2 and T2+T3. The free ARP request packet is identified as a free ARP request packet (IP1). The free ARP request packet (IP1) carries a special label of an IACP protocol. Multiple carrying modes exist, which are not limited thereto. For example, the MAC frame padding filed of the free ARP request packet (IP1) is padded with 0x5A to serve as the special label of the IACP protocol. T2 and T3 are configurable time parameters, and it is assumed that T2 and T3 here are both 100 s.

Random relay is aimed to prevent an Ethernet broadcast storm caused when all clients to which no IP address is assigned send the free ARP request packet to each other at the same time.

S306. The client determines whether the target IP address is occupied.

In the step, the client probes, according to a response message returned by another node on the network segment, into whether the target IP address is occupied. The response message may be an ARP response packet or a free ARP response packet.

Specifically, in the embodiment of the present invention, after a node on the network segment receives the ARP request packet and finds that an IP address contained in the ARP request packet is a local IP address, the node sends the ARP response packet to a sender, to notify a MAC address corresponding to the IP address to the sender. It is assumed that the client 1 in the step receives the ARP response packet sent by the client 2, it indicates that the target IP address is occupied.

The free ARP request packet is used in the following circumstance: When a client desires to use a certain IP address as its own IP address, but does not learn whether IP address conflict will occur, the client broadcasts a free ARP request packet carrying the IP address; and if the client receives a response, it indicates that IP address conflict occurs; otherwise, it indicates that no IP address conflict occurs. The free ARP response packet is used in the following circumstance: When a client desires to use an IP address as its own IP address, the client broadcasts the free ARP response packet over Ethernet to notify an entire Ethernet that the IP address is used by the client.

It can be understood that only a target IP address that is not used by another node can be served as a preemption object.

In the embodiment of the present invention, the client at this stage receives the free ARP request packet, the free ARP response packet, and the ARP response packet sent by other clients. When the client 1 or 2 receives a free ARP response packet (IP1) or an ARP response packet (IP1), it indicates that the IP1 is occupied, and the client 1 or 2 immediately returns to step S304.

After the client 1 or 2 sends a free ARP request packet (IP1), the client 1 or 2 does not receive the free ARP response packet (IP1) and the ARP response packet (IP1) within T4, it indicates that the IP1 is not occupied, and the client 1 or 2 proceeds to step S307. T4 is a configurable time parameter, and it is assumed that T4 here is 1 s.

When the IP1 is assigned to a certain client, the client must immediately return an ARP response packet (IP1) upon receiving any free ARP request packet (IP1), to notify that the IP1 is assigned to the client. It should be noted that the number of ARP response packets (IP1) sent by the client is the same as the number of free ARP request packets (IP1) received by the client.

To enhance system stability, the clients 1 and 2 at this stage may not process the ARP request packet.

S307. Elect a unique client to obtain the IP1.

In the embodiment of the present invention, a client that obtains no IP address returns to step S304, and a client that obtains the IP1 notifies that the IP1 is assigned, and proceeds to step S308.

Multiple modes for electing a client are available, but an election result needs to be unique. The feature is that comparison information for the election is borne in the free ARP request packet (IP1) carrying the special label of the IACP protocol. For example, the comparison information may be a MAC address.

Mode 1: Electing a Client Having a Minimum Ethernet MAC Address Value to Obtain the IP1

In this mode, a feature that the Ethernet MAC value of each client is globally unique is used. The client selects free ARP request packets (IP1) carrying the special label of the IACP protocol from all received free ARP request packets (IP1), and extracts source MAC addresses from the free ARP request packets. The MAC addresses are the MAC addresses of other clients which are on the network segment and to which no IP address is assigned. The MAC address of the client is compared with the MAC addresses. If the value of the MAC address of the client is the minimum, the client obtains the IP1; otherwise, the client cannot obtain the IP1 and returns to step S304.

Mode 2: Electing a Client Having a Maximum Ethernet MAC Address Value to Obtain the IP1

In this mode, the feature that the Ethernet MAC value of each client is globally unique is also used. The client selects free ARP request packets (IP1) carrying the special label of the IACP protocol from all received free ARP request packets (IP1), and extracts source MAC addresses from the free ARP request packets (IP1). The MAC addresses are the MAC addresses of other clients which are on the network segment and to which no IP address is assigned. The MAC address of the client is compared with the MAC addresses. If the value of the MAC address of the client is the maximum, the client obtains the IP1; otherwise, the client cannot obtain the IP1 and returns to step S304.

It can be understood that the above "election" is described from the perspective of multiple clients. If the "election" is described from the perspective of a client, it can be understood that the client determines whether the client is allowed to obtain the IP address. The specific determining mode is: determining, according to the comparison information borne in free ARP request packets sent by other clients, whether the client is allowed to obtain the unassigned IP address, where the comparison information may be a MAC address.

S308. The client that obtains the IP address asserts that the IP1 belongs to the client.

In the embodiment of the present invention, it is assumed that the client 2 obtains the IP1, the client 2 immediately broadcasts a free ARP response packet (IP1) on an entire network segment, and asserts that the IP1 address is assigned and proceeds step S309.

To enhance system stability, the client at this stage does not process the ARP request packet.

S309. Notify the destination MAC address of the probe IP packet to the access router of the client, receive the probe IP packet, and obtain the IP address of the IACP server and route information.

Specifically, in the step, the client may notify the MAC address of the client to the access router through an ARP response message. After receiving the ARP response message, the access router sends the probe IP packet that is previously stored. After receiving the probe IP packet, the client may obtain the information carried in the probe IP packet.

In the embodiment of the present invention, with the step, the probe IP packet (IP1) stored in Router 1 is received. By performing the step:

it is determined that the IP1 is an IP address assigned by the IACP server, by receiving the probe IP packet (IP1);

the route information such as the length of the subnet mask, the gateway IP address, and other possible information is obtained by analyzing the probe IP packet (IP1); for example, the IP address of a second gateway may be obtained when the second gateway is contained on the network segment;

the IP address of the IACP server is obtained by using the source IP address contained in the probe IP packet (IP1), and is used by the client for feeding back completion of the assignment of the IP1 to the IACP server.

The client 2 that obtains the IP1 returns the ARP response packet (IP1) to Router 1, and notifies the MAC address of the client to Router 1. It is assumed that the MAC address is MAC1. Router 1 uses MAC1 as a destination address and sends the probe IP packet (IP1) to the client 2.

After obtaining the probe IP packet (IP1), the client 2 analyzes the IP packet and obtains the subnet mask and gateway IP address on the network segment where the client 2 is located, the IP address of the IACP server, and other possible information, and proceeds step S310.

After proceeding to step S309, if the client 2 does not receive the probe IP packet (IP1) within T5, the client 2 returns to step S304. T5 is a configurable time parameter, and it is assumed that T5 here is 10 s. In addition, T5 may be set to be greater than or equal to T1. Because when a first probe IP packet (IP1) sent by the IACP server is discarded by Router 1, the client may have sufficient time to wait and receive a second probe IP packet (IP2) sent by the IACP server.

S310. The client that obtains the IP address sends an acknowledge message, indicating that the unassigned IP address is assigned, to an IP address assignment server.

In the step, the client notifies the IACP server that a destination IP address IP1 is assigned.

In the embodiment of the present invention, at this stage, the completion of the assignment of IP1 is notified to the IACP server, an IP address assignment pool may be refreshed, and the sending of the probe IP packet (IP1) may be stopped. The client 2 that obtains the IP1 uses the IP address of the IACP server as the destination IP address, and uses the IP1 as a source IP address to send the acknowledge message, indicating that IP1 is assigned, to the IACP server. After receiving the IP packet, the IACP server refreshes the IP address assignment pool (IP address list) and stops sending the probe IP packet (IP1).

The above uses the scenario where the probe IP packet includes only one unassigned IP address, that is, IP1, for illustration. When the probe IP packet includes multiple unassigned IP addresses, after one unassigned IP address, that is, IP1, is assigned, the IACP server receives the acknowledge message that is sent by the client and indicates that the IP1 is assigned, refreshes the IP address assignment pool, and updates the probe IP packet.

Till now, the process of the assignment of the IP address IP1 is completed.

According to the technical solution provided in the embodiment of the present invention, IP address automatic assignment can be completed and a scenario where the client and the IP address assignment server are deployed on different IP networks can be implemented, by using only the basic and necessary functions of an IP network instead of optional functions of the IP network. The technical solution provided in the embodiment of the present invention provides a complete function of IP address automatic assignment without the need of the special function of a Layer 3 IP network. Meanwhile the solution is also applicable to a scenario where a bearer network is a Layer 2 Ethernet. The solution may reach the following effects:

1. reducing the cost of the Layer 3 IP network for the reason that the solution only requires the basic and necessary functions of the network;

2. increasing the usage range of the automatic configuration of the IP address, implementing the automatic configuration of the IP address without the need of a special function, thereby reducing the difficulty and cost of the IP address assignment; and 3. being applicable to the scenario where the bearer network is a Layer 2 Ethernet, implementing IP address assignment on both the Layer 3 IP network and the Layer 2 Ethernet by using only one IP address automatic assignment technology, and reducing network deployment cost.

Embodiment 4

Figure 4A:
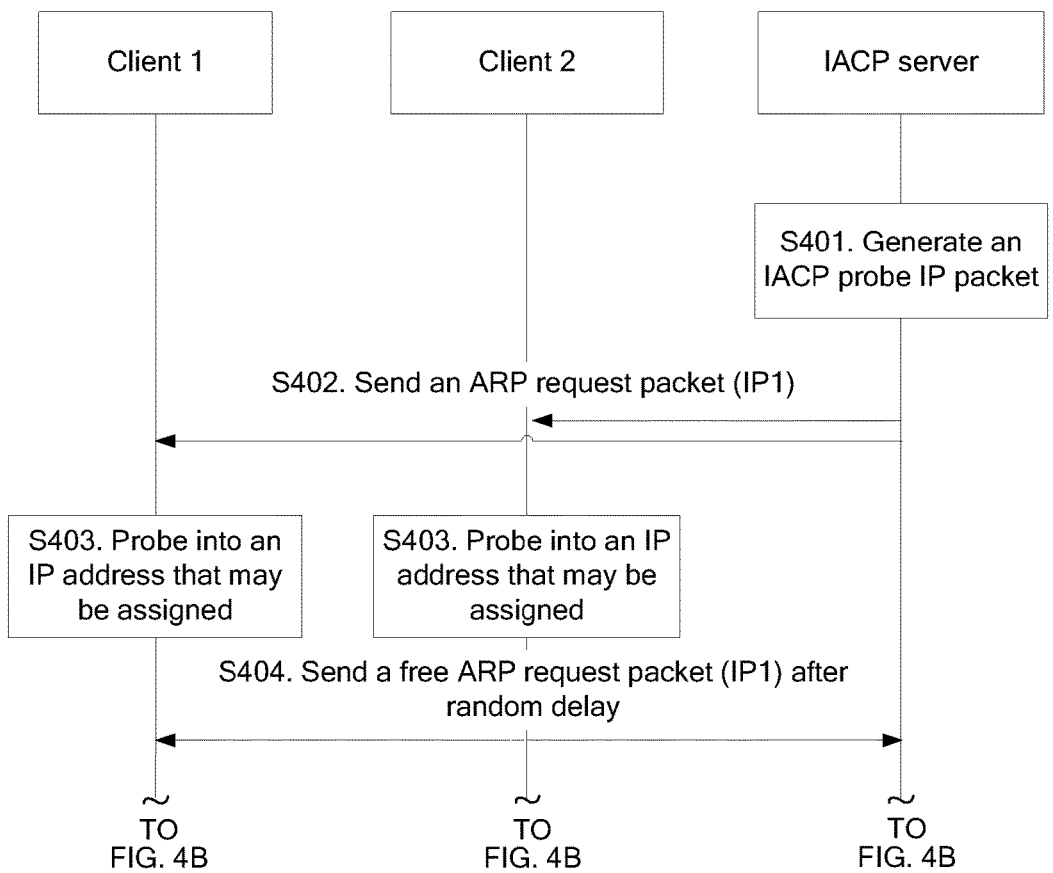
FIG. 4A and FIG. 4B are a signaling diagram of an IP address automatic assignment method according to an embodiment of the present invention.
Figure 4B:
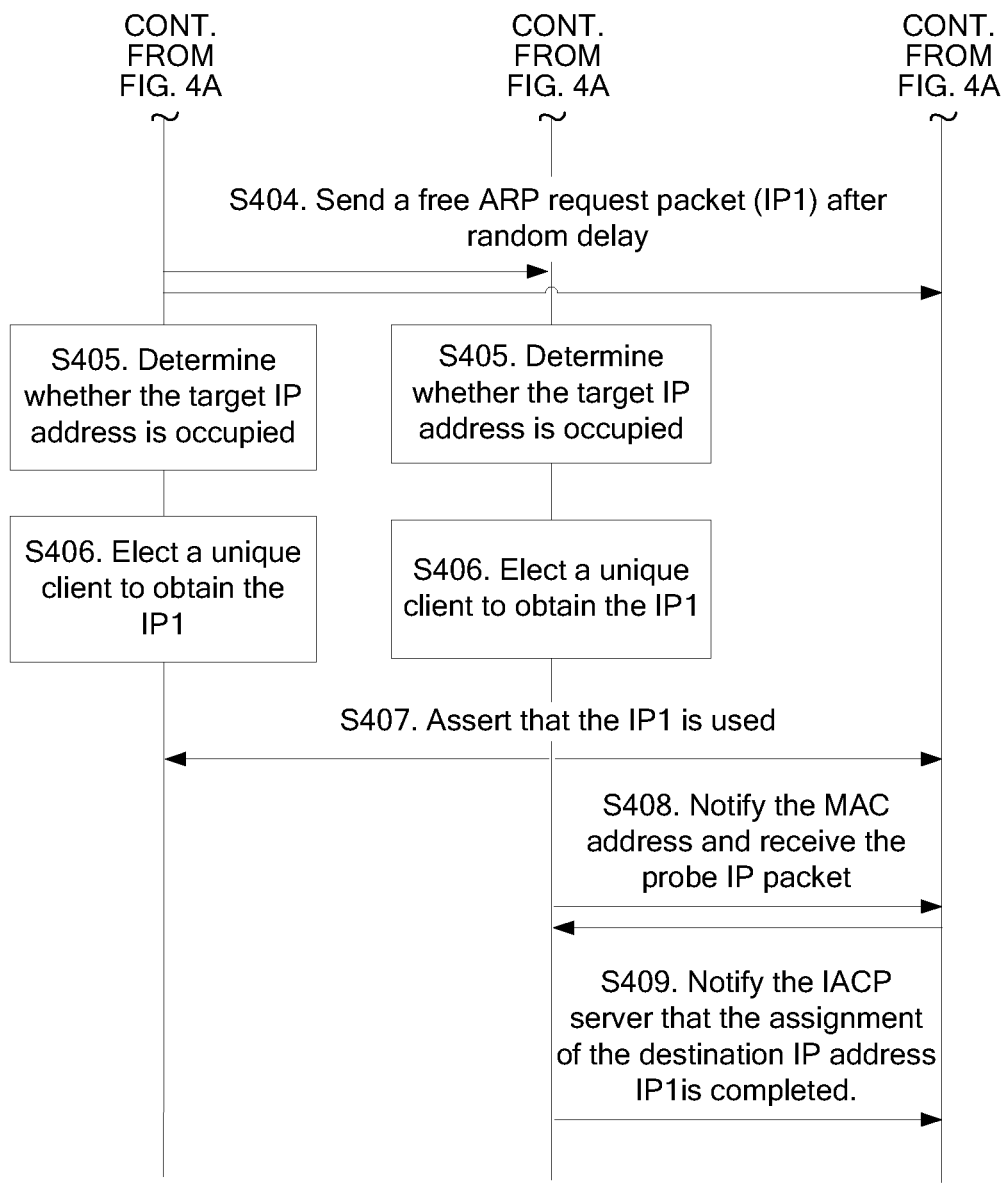

FIG. 4A and FIG. 4B are a signaling diagram of an IP address automatic assignment method according to an embodiment of the present invention. As shown in FIG. 4A and FIG. 4B, an IP address needs to be assigned to a client, and an IACP server provides an IP address assignment service. In the embodiment, the client and the IACP server implement IP address automatic assignment on the same network segment. As shown in FIG. 4A and FIG. 4B, the method includes the following steps:

S401. An IACP server generates a probe IP packet containing an unassigned IP address, where the packet carries the IP address and route information.

In the embodiment of the present invention, the step is the same as step S301 in the third embodiment, which is not detailed here.

S402. The IACP server sends an ARP request packet containing a target IP address to a local network segment.

In the embodiment of the present invention, if the IACP server needs to send a probe IP packet (IP1), the IACP server must learn a MAC address corresponding to the IP1. The IP1 is an unassigned IP address. Therefore, the IACP server learns that the IP1 and the IACP server are on the same network segment, but does not learn an Ethernet MAC address corresponding to the IP1. The IACP server must broadcast an ARP request packet on a network segment where the IP1 is located, where the ARP request packet may be used to query a MAC address corresponding to the IP1. The ARP request packet here may be referred to as an ARP request packet (IP1). Any client on the network segment where the IP1 is located can receive the ARP request packet (IP1).

In the embodiment of the present invention, the IACP server sends the ARP request packet (IP1) to the local network segment. It can be understood that the word "send" here may refer to a periodical sending mode, or an event triggered sending mode. The following mainly uses the periodical sending mode as an example for illustration.

To ensure that the ARP request packet (IP1) can be sent, the IACP server repeatedly sends the ARP request packet (IP1) with a certain period T1. The sending of the ARP request packet (IP1) stops until a certain client feeds back completion of IP1 assignment. T1 is a configurable time parameter, and it is assumed that T1 here is 5 s.

S403. The client receives the ARP request packet, and uses the packet to probe into an IP address that may be assigned.

In the embodiment of the present invention, the step is the same as step S304 in the third embodiment, which is not detailed here.

S404. After random delay, the client sends a free ARP request packet to probe into whether the target IP address is occupied by another client.

In the embodiment of the present invention, the step is the same as step S305 in the third embodiment, which is not detailed here.

S405. The client determines whether the target IP address is occupied, by probing into whether an ARP response packet and a free ARP response packet are received.

It can be understood that only a target IP address that is not used by another node (for example, a client) can be served as a preemption object.

In the embodiment of the present invention, the step is the same as step S306 in the third embodiment, which is not detailed here.

S406. The clients elect a unique client to obtain the IP1.

In the embodiment of the present invention, the step is the same as step S307 in the third embodiment, which is not detailed here.

S407. The client that obtains the IP address asserts that the IP1 belongs to the client and other clients cannot preempt the IP1.

In the embodiment of the present invention, the step is the same as step S308 in the third embodiment, which is not detailed here.

S408. Notify the MAC address of the client to the IACP server, receive the probe IP packet, and obtain the IP address and route information of the IACP server.

Specifically, in the step, the client may notify the MAC address of the client to the server through an ARP response message. After receiving the ARP response message, the server sends the probe IP packet that is previously generated. After receiving the probe IP packet, the client may obtain the information carried in the probe IP packet.

With the step, the probe IP packet (IP1) stored in the IACP server is received. By performing the step:

it is determined that the IP1 is an IP address assigned by the IACP server, by receiving the probe IP packet (IP1);

the route information such as the length of the subnet mask, the gateway IP address, and other possible information is obtained by analyzing the probe IP packet (IP1); for example, the IP address of a second gateway may be obtained when the second gateway is contained on the network segment;

the IP address of the IACP server is obtained by using the source IP address contained in the probe IP packet (IP1), and is used by the client for feeding back completion of the assignment of the IP1 to the IACP server.

The client that obtains the IP1 returns the ARP response packet (IP1) to the IACP server, and notifies the MAC address of the client to the IACP server. It is assumed that the MAC address is MAC1. The IACP server uses MAC1 as a destination address and sends the probe IP packet (IP1) to the client.

After obtaining the probe IP packet (IP1), the client analyzes the IP packet and obtains the subnet mask and gateway IP address on the network segment where the client is located, the IP address of the IACP server, and other possible information, and proceeds step S409.

After proceeding to step S408, if the client does not receive the probe IP packet (IP1) within T5, the client returns to step S403. T5 is a configurable time parameter, and it is assumed that T5 here is 10 s. In addition, T5 may be set to be greater than or equal to T1, so as to ensure that the client have sufficient time to receive a second ARP request packet (IP1) sent by the IACP server, and the client may return the ARP response packet (IP1) in time; and the IACP server may send the probe IP packet (IP1) to the client in time.

S409. The client notifies the IACP server that a destination IP address IP1 is assigned.

In the embodiment of the present invention, the step is the same as step S310 in the third embodiment, which is not detailed here.

Till now, the process of the assignment of the IP address IP1 is complete.

According to the technical solution provided in the embodiment of the present invention, IP address automatic assignment can be completed and a scenario where the client and the IP address assignment server are deployed on different IP networks can be implemented, by using only the basic and necessary functions of an IP network instead of optional functions of the IP network. The technical solution provided in the embodiment of the present invention provides a complete function of IP address automatic assignment, without the need of the special function of a Layer 3

IP network. Meanwhile the solution is also applicable to a scenario where a bearer network is a Layer 2 Ethernet. The solution may reach the following effects:

1. reducing the cost of the Layer 3 IP network for the reason that the solution only requires the basic and necessary functions of the network;

2. increasing the usage range of the automatic configuration of the IP address, implementing the automatic configuration of the IP address without the need of a special function, thereby reducing the difficulty and cost of the IP address assignment; and 3. being applicable to the scenario where the bearer network is a Layer 2 Ethernet, implementing IP address assignment on both the Layer 3 IP network and the Layer 2 Ethernet by using only one IP address automatic assignment technology, and reducing network deployment cost.

Embodiment 5

Figure 5:
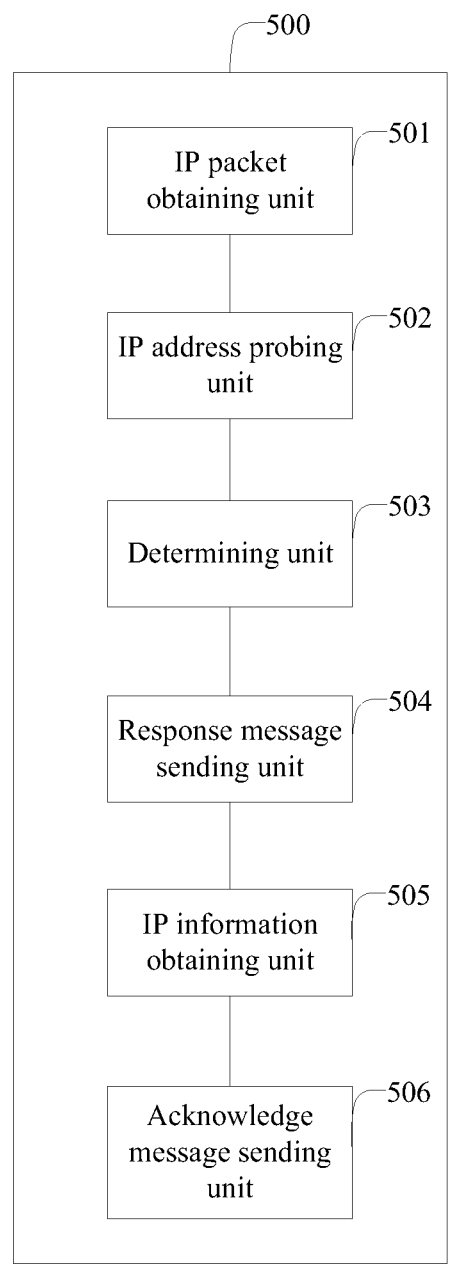
FIG. 5 is a block diagram of an IP address client 500 according to an embodiment of the present invention.

FIG. 5 is a block diagram of an IP address client 500 according to an embodiment of the present invention. As shown in FIG. 5, the IP address client 500 includes: an IP packet obtaining unit 501, an IP address probing unit 502, and a determining unit 503.

The IP packet obtaining unit 501 is configured to obtain an IP packet containing an unassigned IP address.

In the embodiment of the present invention, the IP packet obtaining unit 501 is configured to obtain the IP packet sent by an access router or an IACP server, where the IP packet may be an ARP request packet containing an unassigned IP address.

The IP address probing unit 502 is configured to probe into whether the unassigned IP address in the IP packet obtained by the IP packet obtaining unit 501 is occupied.

Figure 6:
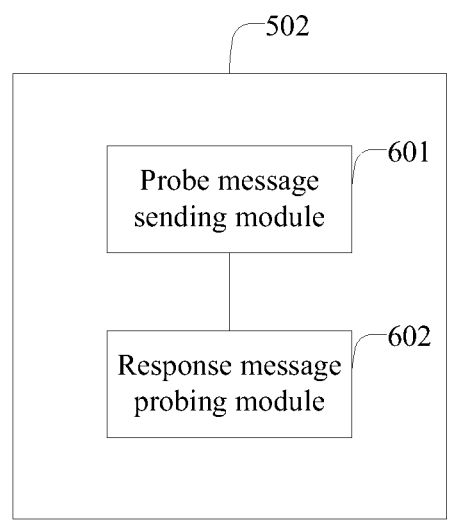
FIG. 6 is a block diagram of an IP address probing unit 502 according to an embodiment of the present invention.

FIG. 6 is a block diagram of the IP address probing unit 502 according to an embodiment of the present invention. As shown in FIG. 6, the IP address probing unit 502 may include: a probe message sending module 601, and a response message probing module 602.

The probe message sending module 601 is configured to send a probe message containing an unassigned IP address to another node on a local network segment.

In the embodiment of the present invention, the probe message sending module 601 may be configured to perform step S305 illustrated in FIG. 3A and FIG. 3B or step S404 illustrated in FIG. 4A and FIG. 4B.

The response message probing module 602 is configured to probe, according to a response message returned by another node on the local network segment, into whether the unassigned IP address is occupied.

In the embodiment of the present invention, the response message probing module 602 may be configured to perform step S306 illustrated in FIG. 3A and FIG. 3B or step S405 illustrated in FIG. 4A and FIG. 4B.

The determining unit 503 is configured to determine whether a local client is allowed to obtain the unassigned IP address, when the IP address probing unit 502 detects that the unassigned IP address is not occupied.

In the embodiment of the present invention, the determining unit 503 may be configured to perform step S307 illustrated in FIG. 3A and FIG. 3B and step S406 illustrated in FIG. 4A and FIG. 4B. The determining unit 503 may include: a first module, configured to receive a free ARP request packet from another client; and a second module, configured to determine, according to comparison information borne in the free ARP request packet that is received by the first module and is sent by another client, whether the client is allowed to obtain the unassigned IP address.

According to another embodiment of the present invention, the IP address client 500 may further include:

a response message sending unit 504, configured to, broadcast on a local network segment, a response message indicating that the unassigned IP address is occupied, after the client obtains the IP address. In the embodiment of the present invention, the network segment refers to a network segment where the client is located.

In the embodiment of the present invention, the response message sending unit 504 may be configured to perform step S308 illustrated in FIG. 3A and FIG. 3B or step S407 illustrated in FIG. 4A and FIG. 4B.

According to another embodiment of the present invention, the IP address client 500 may further include:

an IP information obtaining unit 505, configured to obtain a subnet mask and a gateway IP address on the network segment, and the IP address of an IP address assignment server, after the client obtains the IP address.

In the embodiment of the present invention, the IP information obtaining unit 505 may be configured to perform step S309 illustrated in FIG. 3A and FIG. 3B or step S408 illustrated in FIG. 4A and FIG. 4B.

According to another embodiment of the present invention, the IP address client 500 may further include:

an acknowledge message sending unit 506, configured to send an acknowledge message, indicating that the unassigned IP address is assigned, to the IP address assignment server, after the client obtains the IP address. Specifically, the acknowledge message indicating that the unassigned IP address is assigned may be sent to the IP address assignment server according to the obtained IP address of the IP address assignment server.

In the embodiment of the present invention, the acknowledge message sending unit 506 may be configured to perform step S310 illustrated in FIG. 3A and FIG. 3B and step S409 illustrated in FIG. 4A and FIG. 4B.

According to the technique used in the embodiment of the present invention, an IACP server actively sends an unassigned IP address, and a client actively obtains the unassigned IP address, thereby solving the problem in the prior art that a DHCP Relay host needs to be added additionally to assign an IP address to a client when a DHCP server and the client are not on the same network segment, saving configuration cost and simplifying network configuration.

Embodiment 6

Figure 7:
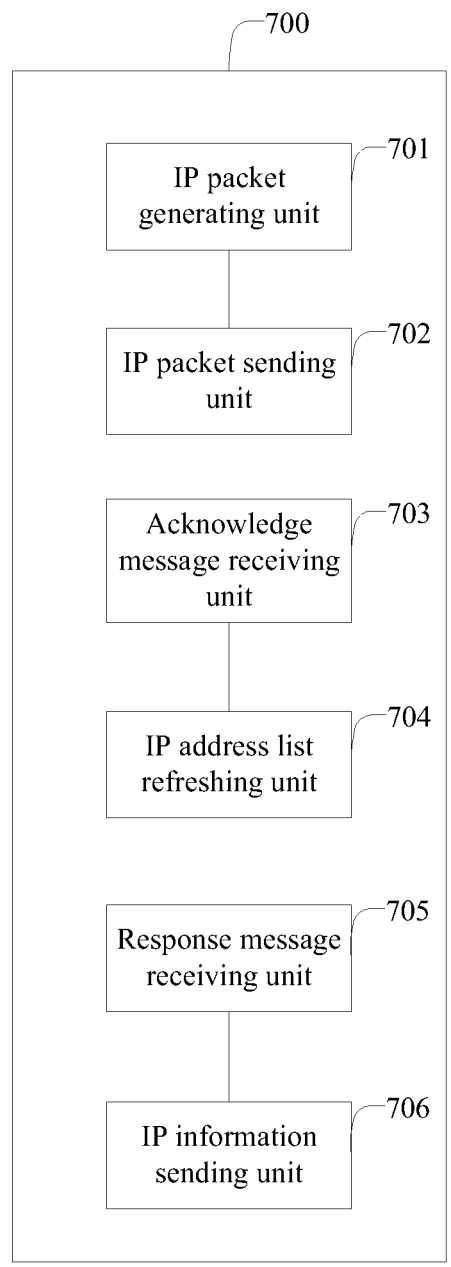
FIG. 7 is a block diagram of an IP address automatic assignment server 700 according to an embodiment of the present invention.

FIG. 7 is a block diagram of an IP address automatic assignment server 700 according to an embodiment of the present invention. As shown in FIG. 7, the IP address automatic assignment server 700 includes: an IP packet generating unit 701, an IP packet sending unit 702; and an acknowledge message receiving unit 703.

The IP packet generating unit 701 is configured to generate an IP packet containing an unassigned IP address.

The IP packet sending unit 702 is configured to periodically send the IP packet generated by the packet generating unit to a network segment where the unassigned IP address is located. It can be understood that a client to which no IP address is assigned exists on the network segment.

The acknowledge message receiving unit 703 is configured to receive an acknowledge message indicating that the unassigned IP address is assigned.

In the embodiment of the present invention, the acknowledge message receiving unit 703 receives the acknowledge message that is sent by a client and indicates that the IP address is assigned.

In the embodiment of the present invention, the IP packet sending unit 702 may be configured to periodically send the IP packet.

Optionally, the IP packet sending unit 702 may include: a probe IP packet sending module, configured to send a probe IP packet to an access router on the network segment where the unassigned IP address is located when the client and an IP address assignment server are not on the same network segment; accordingly, the IP packet sending unit is configured to send a probe IP packet generated by a probe IP packet generating module to the access router on the network segment where the unassigned IP address is located.

Optionally, the IP packet sending unit 702 may include: an ARP request packet generating module, configured to generate an ARP request packet containing an unassigned IP address when the client and the IP address assignment server are on the same network segment; and accordingly, the IP packet sending unit is configured to send the ARP request packet generated by the ARP request packet generating module to a client on the network segment where the unassigned IP address is located.

According to another embodiment of the present invention, the IP address automatic assignment server 700 may further include:

an IP list refreshing unit 704, configured to refresh a list of unassigned IP addresses according to a received notification message.

In the embodiment of the present invention, the IP list refreshing unit 704 removes an assigned IP address from the list of unassigned addresses according to the received notification message to form a new list of unassigned IP addresses.

According to another embodiment of the present invention, the IP address automatic assignment server 700 may further include:

a response message receiving unit 705, configured to receive a response message that indicates that the unassigned IP address is occupied and is sent by the client that obtains the IP address; and an IP information sending unit 706, configured to send, according to the received response message, a subnet mask and a gateway IP address on the network segment where the unassigned IP address is located, and the IP address of the IP assignment server to the client that obtains the IP address.

In the embodiment of the present invention, the response message receiving unit 705 and the IP information sending unit 706 may be configured to perform step S309 illustrated in FIG. 3A and FIG. 3B or step S408 illustrated in FIG. 4A and FIG. 4B.

According to the technique used in the embodiment of the present invention, an IACP server actively sends an unassigned IP address, and a client actively obtains the unassigned IP address, thereby solving the problem in the prior art that a DHCP Relay host needs to be added additionally to assign an IP address to a client when a DHCP server and the client are not on the same network segment, saving configuration cost and simplifying network configuration.

The above embodiments describe in detail the objectives, technical solutions, and beneficial effects of the present invention. It should be understood that the above description is merely about the exemplary embodiments of the present invention, and is not intended to limit the protection scope of the present invention. Any modification, equivalent replacement, and improvement made without departing from the principle of the present invention shall fall within the protection scope of the present invention.

Figure 8:
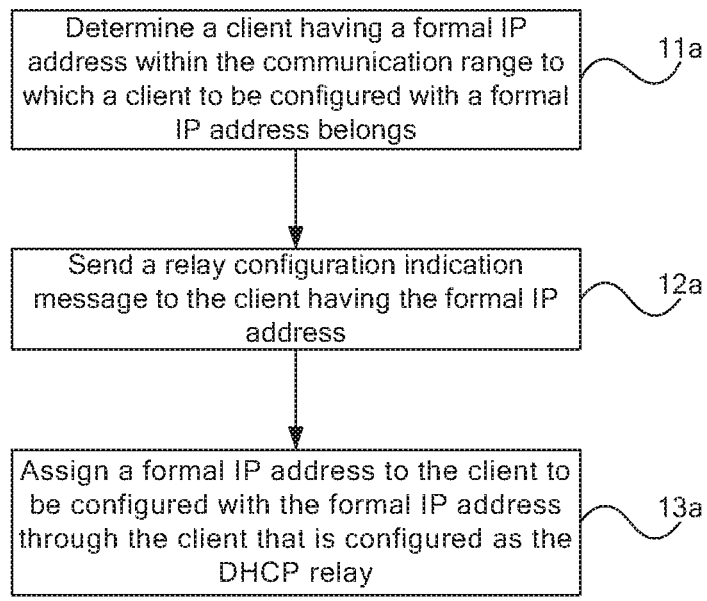
FIG. 8 is a schematic flowchart of a method according to an embodiment of the present invention.

In another aspect:

FIG. 8 is a schematic flowchart of a method according to an embodiment of the present invention. The method includes the following steps:

Step 11*a*: A server determines a client having a formal IP address which is a configured IP address, within the communication range to which a client to be configured with a formal IP address belongs.

The server may include a DHCP unit. The DHCP unit can provide the function of a DHCP server. That is, when a client requests an IP address by using a DHCP procedure, the DHCP unit may provide a corresponding formal IP address for the client.

For ease of implementation of the DHCP procedure, the server may also include an IP Auto Configuration Protocol (IP Auto Configuration Protocol, IACP) unit. The IACP unit is configured to assign a temporary IP address to the client.

The above DHCP unit and IACP unit may be located in the same physical entity. In this case, the server may be specifically a physical entity to which the DHCP unit and the IACP belong. The DHCP unit and IACP unit may also be located in different physical entities. In this case, the server may include a physical entity to which the DHCP unit belongs and a physical entity to which the IACP unit belongs. For specific functions and procedure application of the DHCP unit and the IACP unit, reference can be made to the following embodiment.

The configured IP address refers to an IP address obtained by using DHCP, or an IP address obtained in manual configuration mode, or an IP address obtained in other dynamic IP address assignment modes. The configured IP address is a general IP address in a communication system. However, the temporary IP address is an IP address used temporarily for obtaining a formal IP address.

When a VLAN is not planned in a system, the communication range refers to a certain network segment; when the VLAN is planned in the system, the communication range refers to a certain VLAN of a certain network segment.

Step 12*a*: The server sends a relay configuration indication message to the client having the formal IP address, where the relay configuration indication message carries DHCP configuration information.

Step 13*a*: After the client having the formal IP address configures itself as a DHCP relay according to the DHCP configuration information, the server assigns a formal IP address to the client to be configured with the formal IP address, through the client that is configured as the DHCP relay.

According to the embodiment, the client having the formal IP address configures itself as a DHCP relay; when DHCP is used to configure the IP address, a dedicated DHCP relay is not required to be set in a network system. In this way, network investment and maintenance cost are reduced.

Figure 9:
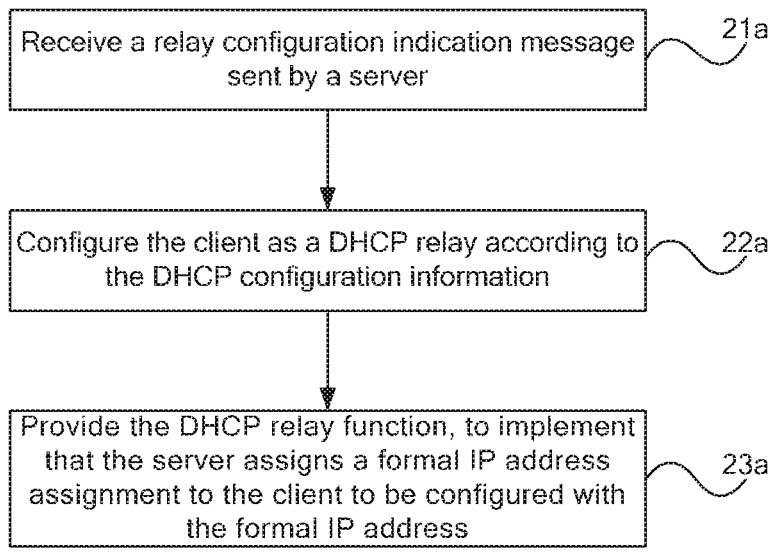
FIG. 9 is a schematic flowchart of a method according to an embodiment of the present invention.

FIG. 9 is a schematic flowchart of a method according to an embodiment of the present invention. The method includes the following steps:

Step 21*a*: A client having a formal IP address receives a relay configuration indication message sent by a server, where the relay configuration indication message carries DHCP configuration information, and the client having the formal IP address and a client that is to be configured with a formal IP address are within the same communication range.

Step 22a: The client having the formal IP address configures itself as a DHCP relay according to the DHCP configuration information.

Step 23a: The client that is configured as the DHCP relay provides a DHCP relay function, so that the server assigns a formal IP address to the client that is to be configured with the formal IP address.

Further, the embodiment may further include: obtaining a formal IP address before the client having the formal IP address has the formal IP address; and sending a formal IP address indication message to the server after obtaining the formal IP address, and sending the relay configuration indication message by the server after the server receives the formal IP address indication message.

The obtaining the formal IP address by the client includes:

receiving, by the client, a probe packet sent by the server, where the probe packet carries a temporary IP address, the IP address of a gateway within the communication range, the IP address of the server, and the subnet mask within the communication range; and sending, by the client, a unicast DHCP request to the server according to the temporary IP address, the IP address of the gateway within the communication range, the IP address of the server, and the subnet mask within the communication range, and receiving a formal IP address that is assigned by the server to the client according to the unicast DHCP request.

According to the embodiment, the client having the formal IP address configures itself as a DHCP relay; when DHCP is used to configure the IP address, a dedicated DHCP relay is not required to be set in a network system. In this way, network investment and maintenance cost are reduced.

The embodiments of the present invention are mainly based on the following idea: when the DHCP client and the DHCP server are not on the same network segment, a DHCP relay is required in the system for successful IP address assignment. However, if a dedicated DHCP relay is set specially, the cost will be increased. To solve the problem, according to embodiments of the present invention, no dedicated DHCP relay is set, but the client having the formal IP address is configured as a DHCP relay. In this case, an existing DHCP procedure can be used to assign a formal IP address after the DHCP relay is available. Further, the client having the formal IP address is required during the configuration of the DHCP relay, but no client having the formal IP address may exist within the communication range. In this case, a formal IP address needs to be assigned to at least one client within the communication range, so that the client to which a formal IP address is assigned can be configured as a DHCP relay. In the embodiment of the present invention, assigning a formal IP address to at least one client within the communication range is implemented by using a temporary IP address, and the temporary IP address is obtained by using an IACP procedure.

The specific procedure of IACP can be implemented as follows:

First, a client obtains an IP packet containing an unassigned IP address. For example, when the client and an IP address assignment server are not on the same network segment, the client receives a first address resolution protocol ARP request packet sent by an access router on a network segment where the client is located; or when the client and an IP address assignment server are on the same network segment, the client receives a second ARP request packet sent by the IP address assignment server.

Secondly, the client probes into whether an unassigned IP address in an obtained IP packet is occupied. For example, a probe message containing an unassigned IP address is sent to another node on a local network segment, and probes, according to a response message returned by another node, into whether the unassigned IP address is occupied.

Thirdly, if the unassigned IP address is not occupied, it is determined whether the client is allowed to obtain the unassigned IP address; if the client is allowed to obtain the unassigned IP address, the client that obtains the unassigned IP address obtains an IP packet containing the unassigned IP address. For example, it is determined, according to comparison information borne in a free ARP request packet received from another client, whether the client is allowed to obtain the unassigned IP address.

The client having the formal IP address is selected because the server can exchange information with a client, for example, sending a relay configuration indication message to the client, according to a normal IP procedure only after the client has a formal IP address.

DHCP configuration information may be stored in advance in the server. In addition, a certain device may have a DHCP relay function only after the device is configured according to the DHCP configuration information. Therefore, when the server sends the DHCP configuration information to the client, the client that receives the DHCP configuration information may configure itself as a DHCP relay according to the DHCP configuration information. The specific content of the DHCP configuration information can be obtained from DHCP configuration information required for an existing DHCP relay, which goes beyond the concern of the embodiments of the present invention.

It can be seen from the above that the embodiment of the present invention may require an IACP procedure and a DHCP procedure. Therefore, in this case, the client and the server both need to have an IACP function and a DHCP function. In the following embodiment, the client may be a client that has the IACP function and the DHCP function. In the server, a unit having the IACP function and a unit having the DHCP function may be set in the same physical entity. In this case, the server may be a server having the IACP function and the DHCP function. Alternatively, the unit having the IACP function and the unit having the DHCP function may be set in different physical entities. In this case, the server may include an IACP server having the IACP function and a DHCP server having the DHCP function. The following embodiment uses a scenario where the IACP function and the DHCP function are set in the same physical entity and a scenario where the IACP function and the DHCP function are set in different physical entities as examples for illustration.

It can be also seen from the above that the VLAN may not be planned in a network system and the communication range refers to a network segment; or the VLAN may be planned in a network system and the communication range refers to a network segment and a VLAN of the network segment. The following embodiment uses a scenario where the VLAN is not planned and a scenario where the VLAN is planned as examples for illustration.

Figure 10A:
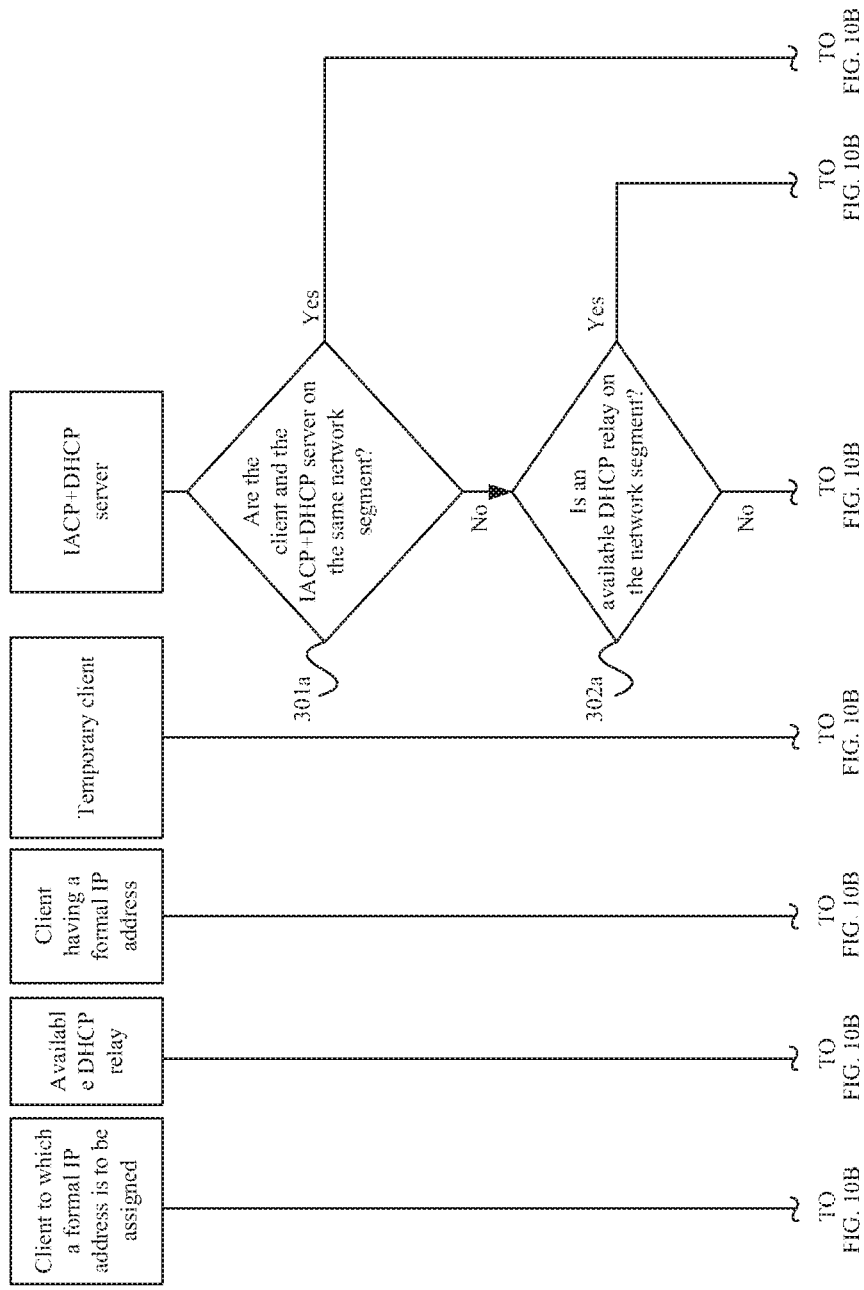
Figure 10B:
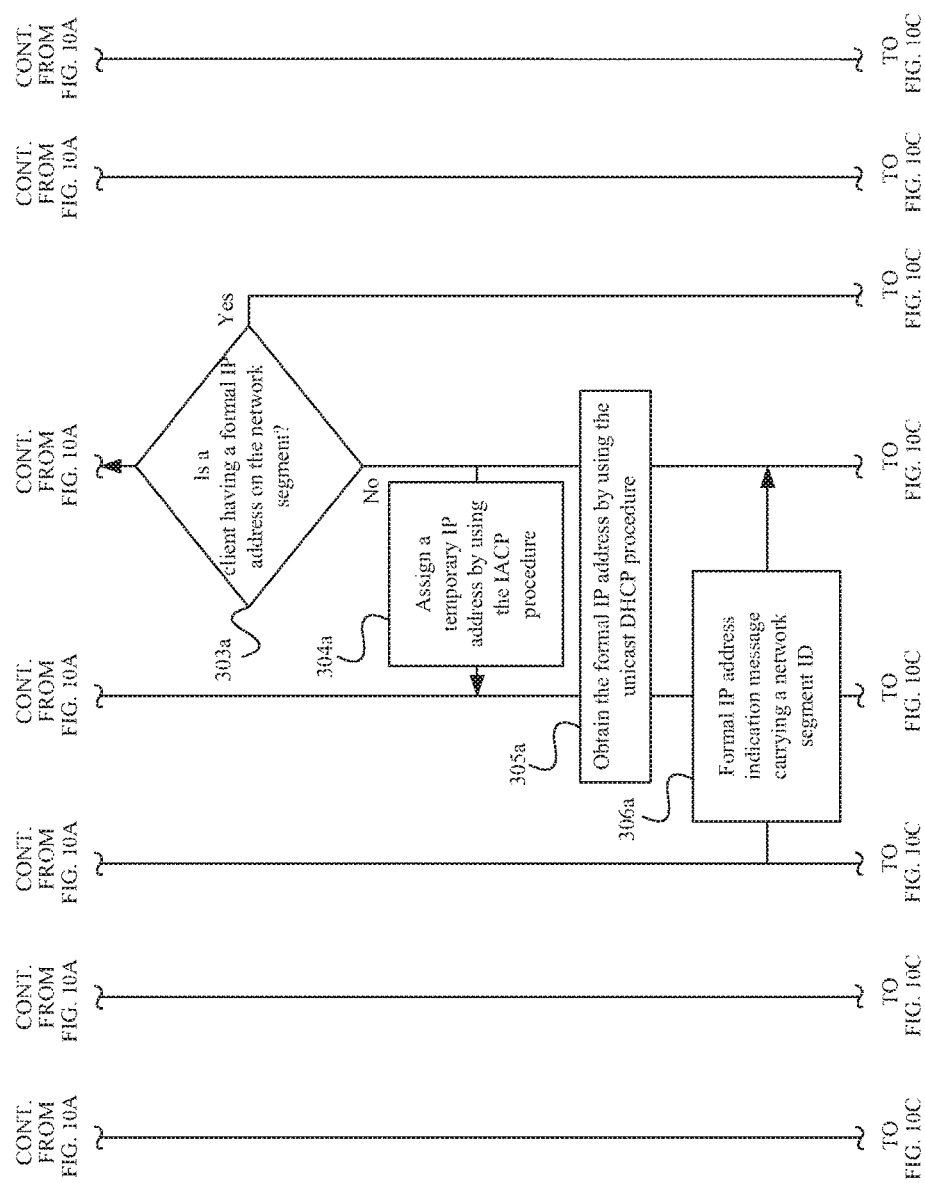

FIG. 10A, FIG. 10B, and FIG. 10C are a schematic flowchart of a method according to an embodiment of the present invention. The embodiment of the present invention uses a scenario where the VLAN is not planned and the IACP function and the DHCP function are set in the same physical entity as an example for illustration.

Figure 11:
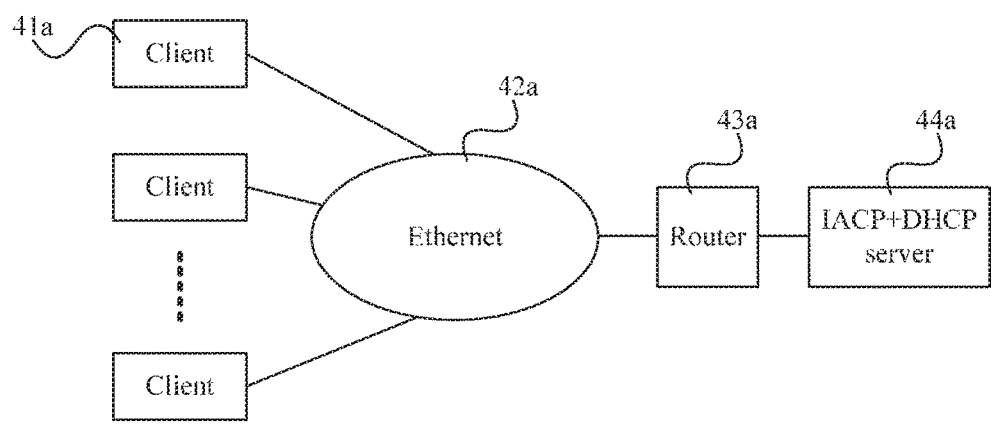
FIG. 11 is a schematic structural diagram of a network system according to an embodiment of the present invention.

FIG. 11 is a schematic structural diagram of a network system according to an embodiment of the present invention. Referring to FIG. 11, the system includes at least one client 41a. The client communicates with an IACP+DHCP server 44a through an Ethernet (Ethernet) 42a and a router 43a. The IACP+DHCP server 44a may have the IACP function and the DHCP function. According to the embodiment, a DHCP relay needs to be configured on a network segment where a client to which a formal IP address is to be assigned.

In the embodiment, unless otherwise specified, a network segment refers to the network segment where the client to which a formal IP address is to be assigned.

Referring to FIG. 10A, FIG. 10B, and FIG. 10C, the embodiment includes the following steps:

Step 301a: After being started, an IACP+DHCP server determines whether the IACP+DHCP server and the client belong to the same network segment, where a formal IP address is to be assigned to the client; if they are on the same network segment, step 311a is performed; otherwise, step 302a is performed.

The IACP+DHCP server stores related information about the client, where the related information includes the network segment identifier of the network segment to which the client belongs. Therefore, the IACP+DHCP server may determine whether the IACP+DHCP server and the client to which a formal IP address is to be assigned are on the same network segment.

Step 302a: The IACP+DHCP server determines whether an available DHCP relay exists on the network segment to which the client belongs, where the formal IP address is to be assigned to the client; if an available DHCP relay exists, step 310a is performed; otherwise, step 303a is performed.

Specifically, in the network system, the client having the formal IP address may send a relay capability indication message to the IACP+DHCP server, where the relay capability indication message carries a network segment identifier and capability indication information.

Therefore, the IACP+DHCP server may determine whether an available DHCP relay exists on the network segment by using the following mode:

When the IACP+DHCP server receives, from the client, the relay capability indication message carrying capability indication information and a network segment identifier, where the capability indication information indicates that the client sending the relay capability indication message has DHCP relay capability (hereunder referred to as "relay capability"), and the network segment identifier indicates that the client sending the formal IP address indication message and the client that is to be configured with a formal IP address are on the same network segment, the IACP+DHCP server determines that an available DHCP relay exists on the network segment. It can be understood that, the "available DHCP relay" may be a DHCP relay obtained by configuring a client having a formal IP address or may also be a dedicated DHCP relay according to the prior art.

When the IACP+DHCP server does not receive the relay capability indication message, or receives the relay capability indication message but the capability indication information indicates that a client sending the relay capability indication message does not have relay capability, or receives the relay capability indication message but the network segment identifier indicates that the client sending the formal IP address indication message and the client that is to be configured with a formal IP address are not on the same network segment, the IACP+DHCP server determines that no available DHCP relay exists on the network segment.

Step 303a: The IACP+DHCP server determines whether a client having a formal IP address exists on the network segment; if the client having the formal IP address exists on the network segment, step 307a is performed; otherwise, step 304a is performed.

Specifically, in the network system, after the client is started, a client configured with a formal IP address (for example, in manual configuration mode or DHCP configuration mode) may send the formal IP address indication message to the IACP+DHCP server, where the formal IP address indication message carries the network segment identifier.

Therefore, the IACP+DHCP server may determine whether a client having a formal IP address exists on the network segment by using the following mode:

When the IACP+DHCP server receives the formal IP address indication message that is sent by the client and carries the network segment identifier, and the network segment identifier indicates that the client sending the formal IP address indication message and the client that is to be configured with a formal IP address are on the same network segment, the IACP+DHCP server determines that a client configured with a formal IP address exists on the network segment.

When the IACP+DHCP server does not receive the formal IP address indication message, or receives the formal IP address indication message but the network segment identifier indicates that the client sending the formal IP address indication message and the client that is to be configured with a formal IP address are not on the same network segment, the IACP+DHCP server determines that no client that is configured with a formal IP address exists on the network segment.

Step 304a: The IACP+DHCP server assigns a temporary IP address to a temporary client on the network segment by using IACP.

During the IACP procedure, an IACP server may assign an IP address to the network segment. To distinguish from the assigned IP address during the DHCP procedure, the IP address assigned by the IACP server is referred to as a temporary IP address and the client receiving the temporary IP address is referred to as a temporary client.

Specifically, IACP is a protocol used by an IACP server to actively configure an IP address for a client. After being started, the IACP server periodically sends a probe packet to a destination network segment, where a destination address in the probe packet is an unassigned IP address selected by the IACP server. In addition, the probe packet carries an IP address of a gateway and a subnet mask on the destination network segment, and the IP address of the IACP server. After receiving the probe packet, the gateway on the destination network segment broadcasts a request packet to the destination network segment. After the client receives the request packet, a client is elected from clients to which no IP address is assigned to receive the IP address selected by the IACP server. The elected client receives the probe packet sent by the IACP server and obtains the IP address assigned by the IACP server.

Step 305a: The temporary client obtains a formal IP address from the IACP+DHCP server by using a unicast DHCP procedure according to the temporary IP address, IP address of the gateway, subnet mask, and IP address of the IACP+DHCP server in a probe packet.

Specifically, when the temporary client learns, according to the subnet mask, that the temporary client and the IACP+DHCP server are on the same network segment, the temporary client may send a DHCP search packet to the IACP+DHCP server according to the IP address of the IACP+DHCP server. After receiving the DHCP search packet, the IACP+DHCP server assigns a formal IP address and performs a normal DHCP procedure. When the temporary client learns, according to the subnet mask, that the temporary client and the IACP+DHCP server are not on the same network segment, the temporary client may send a DHCP search packet to the IACP+DHCP server according to the IP address of the gateway and the IP address of the IACP+DHCP server by using the gateway. After receiving the DHCP search packet, the IACP+DHCP server assigns a formal IP address and performs a normal DHCP procedure.

After obtaining the formal IP address, the temporary client may release the temporary IP address and the IACP+DHCP server may withdraw the temporary IP address. In this way, the temporary IP address may be reused subsequently.

Step 306a: The client having the formal IP address sends a formal IP address indication message to the IACP+DHCP server, where the formal IP address indication message carries the network segment identifier.

Afterwards, step 303a is repeatedly performed.

It can be understood that after a temporary client obtains a formal IP address, the temporary client is also the client having the formal IP address.

Step 307a: The IACP+DHCP server sends a relay configuration indication message to the client having the formal IP address, where the relay configuration indication message carries DHCP configuration information.

Step 308a: The client having the formal IP address configures itself as an available DHCP relay according to the DHCP configuration information.

Afterwards, step 302a is repeatedly performed.

Step 309a: The available DHCP relay sends a relay capability indication message to the IACP+DHCP server, where the relay capability indication message carries capability indication information and a network segment identifier.

It can be understood that after being configured as an available DHCP relay, the client having the formal IP address is also an available DHCP relay.

Step 310a: The IACP+DHCP server assigns a formal IP address to the client to which the formal IP address is to be assigned, through the available DHCP relay.

Specifically, a DHCP relay exists in the network system. Therefore, the IP address can be assigned according to a normal DHCP procedure.

Step 311a: The IACP+DHCP server directly assigns a formal IP address to the client that is to be configured with a formal IP address.

Specifically, the client to be configured with an IP address and the IACP+DHCP server are on the same network segment. Therefore, the IP address can be assigned according to the normal DHCP procedure.

According to the technical solution provided in the embodiment, the client having the formal IP address configures itself as a DHCP relay; when DHCP is used to configure the IP address, a dedicated DHCP relay is not required to be set in a network system. In this way, network investment and maintenance cost are reduced.

Further, in this embodiment, the network segment identifier is used when relevant determination is performed, which may be applicable to the scenario where the VLAN is not planned in the network system.

In addition, in the embodiment, a probe packet in the IACP procedure carries the address of the IACP+DHCP server, which may be applicable to the scenario where the DHCP function and the IACP function are integrated in the same physical entity.

Figure 12A:
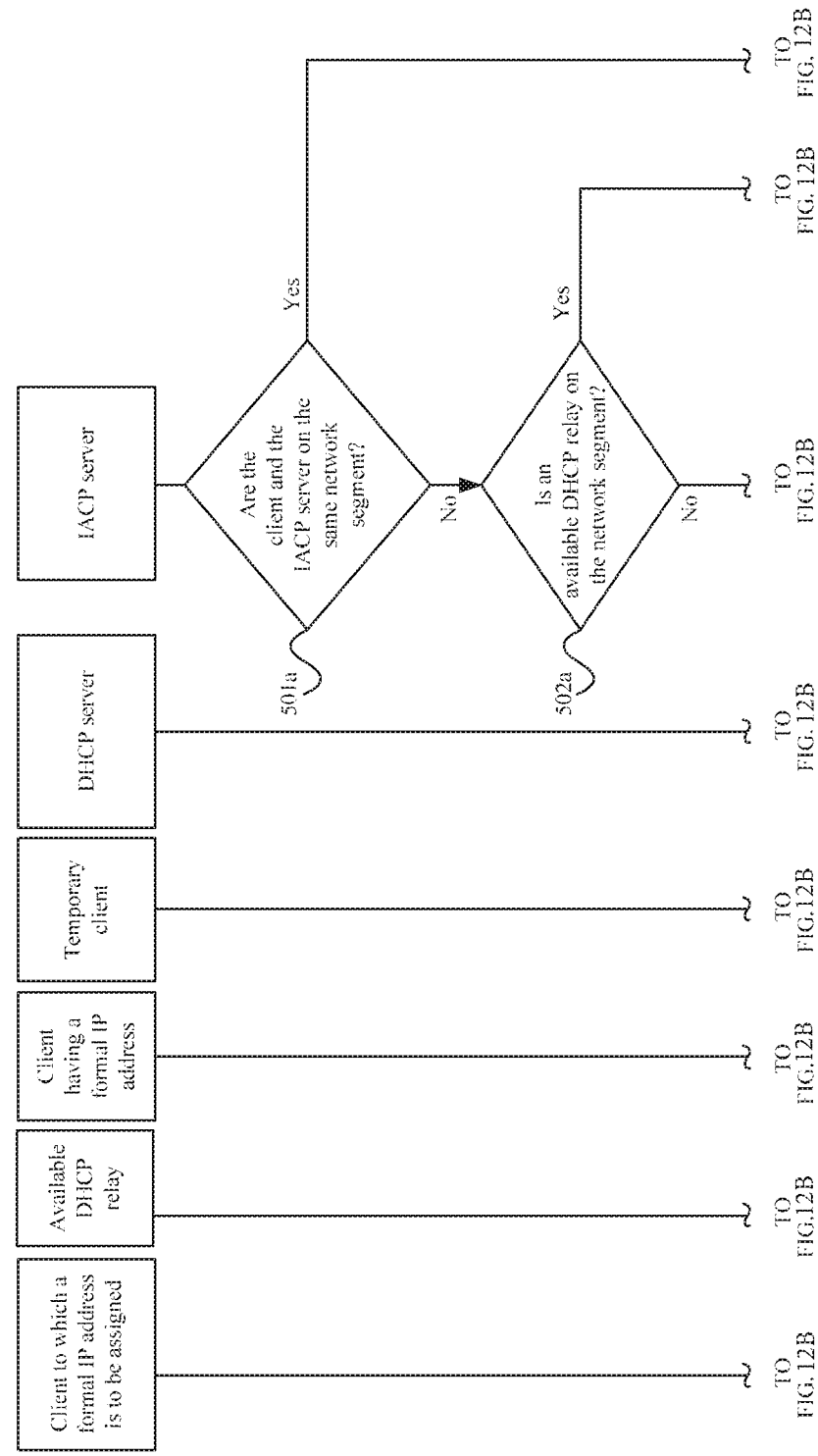
Figure 12C:
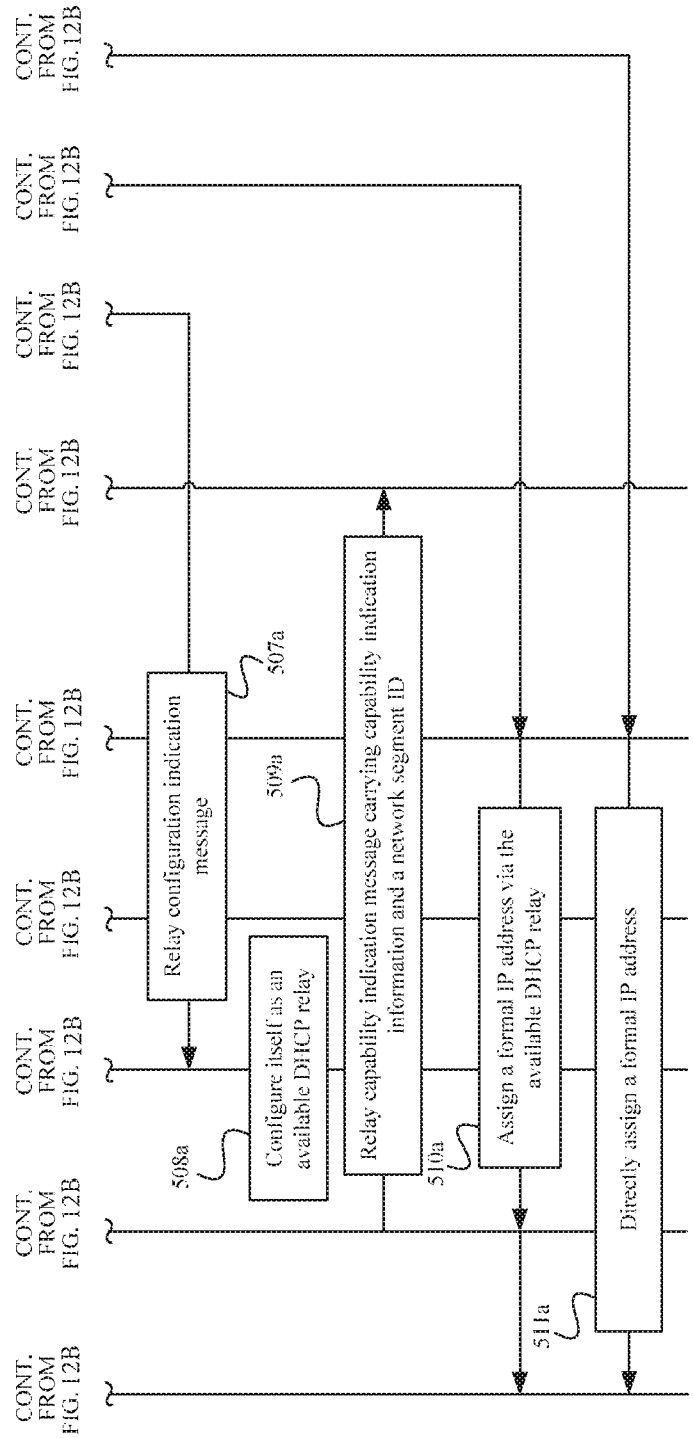

FIG. 12A, FIG. 12B, and FIG. 12C are a schematic flowchart of a method according to an embodiment of the present invention. The embodiment uses the scenario where the VLAN is not planned and the IACP function and the DHCP function are set in different physical entities as an example for illustration.

Figure 13:
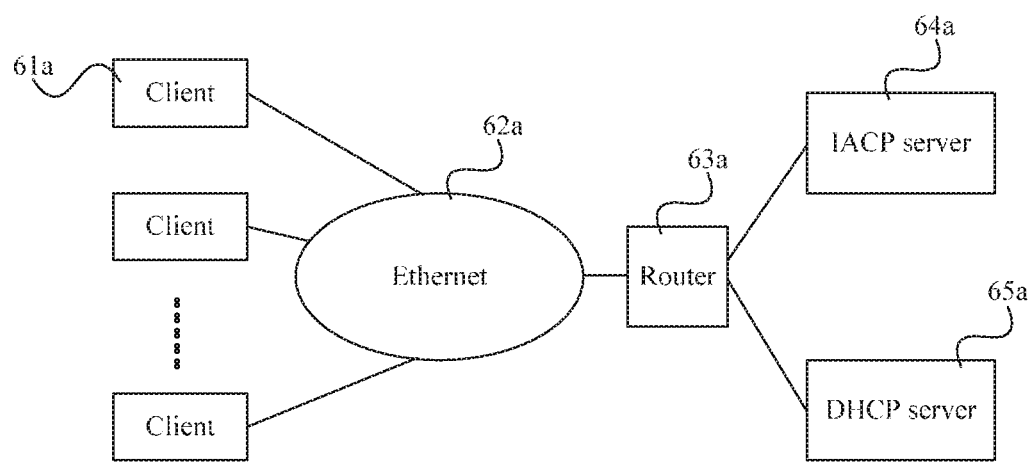
FIG. 13 is a schematic structural diagram of a network system according to an embodiment of the present invention.

FIG. 13 is a schematic structural diagram of a network system according to an embodiment of the present invention. Referring to FIG. 13, the system includes at least one client 61a. The client 61a communicates with an IACP server 64a and a DHCP server 65a through an Ethernet (Ethernet) 62a and a router 63a. The IACP server 64a has the IACP function and the DHCP server 65a has the DHCP function. According to the embodiment, a DHCP relay needs to be configured on a network segment to which a client belongs, where a formal IP address is to be assigned to the client.

In the embodiment, unless otherwise specified, a network segment refers to the network segment to which the client belongs, where a formal IP address is to be assigned to the client.

Referring to FIG. 12A, FIG. 12B, and FIG. 12C, the embodiment includes the following steps:

Step 501a: A determining device determines whether a DHCP server and a client to which a formal IP address is to be assigned are on the same network segment; if they are on the same network segment, step 511a is performed; otherwise, step 502a is performed.

The determining device is a function module in a server, and may be located in an IACP server, or a DHCP server, or separately set outside of an IACP server and a DHCP server. FIG. 12A, FIG. 12B, and FIG. 12C use a scenario where the determining device is located in the IACP server as an example for illustration.

The determining device stores related information about a client, where the related information includes the network segment identifier of a network segment to which the client belongs. Therefore, the determining device may determine whether the DHCP server and the client to which a formal IP address is to be assigned are on the same network segment.

Step 502a: The determining device determines whether an available DHCP relay exists on the network segment to which the client belongs, where a formal IP address is to be assigned to the client; if an available DHCP relay exists, step 510a is performed; otherwise, step 503a is performed.

Specifically, in a network system, a client having a formal IP address may send a relay capability indication message to the determining device, where the relay capability indication message carries a network segment identifier and capability indication information.

Therefore, the determining device may determine whether an available DHCP relay exists on the network segment by using the following mode:

When the determining device receives, from the client, the relay capability indication message carrying the capability indication information and the network segment identifier, where the capability indication information indicates that the client sending the relay capability indication message has relay capability, and the network segment identifier indicates that the client sending a formal IP address indication message and the client to be configured with a formal IP address are on the same network segment, the determining device determines that an available DHCP relay exists on the network segment. It can be understood that, the "available DHCP relay" may be a DHCP relay obtained by configuring a client having a formal IP address or a dedicated DHCP relay according to the prior art.

When the determining device does not receive the relay capability indication message, or receives the relay capability indication message but the capability indication information indicates that the client sending the relay capability indication message does not have DHCP relay capability, or receives the relay capability indication message but the network segment identifier indicates that the client sending the formal IP address indication message and the client to be configured with a formal IP address are not on the same network segment, the determining device determines that no available DHCP relay exists on the network segment.

Step 503*a*: The determining device determines whether a client having a formal IP address exists on the network segment; if a client having a formal IP address exists on the network segment, step 507*a* is performed; otherwise, step 504*a* is performed.

Specifically, in the network system, after the client is started, a client configured with a formal IP address (for example, in manual configuration mode or DHCP configuration mode) may send a formal IP address indication message to the determining device, where the formal IP address indication message carries a network segment identifier.

Therefore, the determining device may determine whether a client having a formal IP address exists on the network segment by using the following mode:

When the determining device receives the formal IP address indication message that is sent by the client and carries the network segment identifier, and the network segment identifier indicates that the client sending the formal IP address indication message and the client to be configured with a formal IP address are on the same network segment, the determining device determines that a client configured with a formal IP address exists on the network segment.

When the determining device does not receive the formal IP address indication message, or receives the formal IP address indication message but the network segment identifier indicates that the client sending the formal IP address indication message and the client to be configured with a formal IP address are not on the same network segment, the determining device determines that no client configured with a formal IP address exists on the network segment.

Step 504*a*: After the determining device triggers the starting of the IACP server, the IACP server assigns a temporary IP address to a temporary client on the network segment by using IACP.

In the embodiment, the IACP server and the DHCP server are set separately. Therefore, server addresses in a probe packet in the embodiment are the IP address of the IACP server and the IP address of the DHCP server. For other details, reference can be made to step 304*a*.

Step 505*a*: The temporary client obtains a formal IP address from the DHCP server by using a unicast DHCP procedure according to a temporary IP address, an IP address of a gateway, a subnet mask, and an IP address of the DHCP server in the probe packet.

Specifically, when the temporary client learns, according to the subnet mask, that the temporary client and the DHCP server are on the same network segment, the temporary client may send a DHCP search packet to the DHCP server according to the IP address of the DHCP server. After receiving the DHCP search packet, the DHCP server assigns a formal IP address and performs a normal DHCP procedure. When the temporary client learns, according to the subnet mask, that the temporary client and the DHCP server are not on the same network segment, the temporary client may send a DHCP search packet to the DHCP server according to the IP address of the gateway and the IP address of the DHCP server via the gateway. After receiving the DHCP search packet, the DHCP server assigns a formal IP address and performs a normal DHCP procedure.

After obtaining the formal IP address, the temporary client may release the temporary IP address and the DHCP server may withdraw the temporary IP address. In this way, the temporary IP address may be reused subsequently.

Step 506*a*: The client having the formal IP address sends a formal IP address indication message to the determining device, where the formal IP address indication message carries a network segment identifier.

Afterwards, step 503*a* may be repeatedly performed.

It can be understood that after obtaining a formal IP address, the temporary client is also the client having the formal IP address.

Step 507*a*: The determining device sends a relay configuration indication message to the client having the formal IP address, where the relay configuration indication message carries DHCP configuration information.

Step 508*a*: The client having the formal IP address configures itself as an available DHCP relay according to the DHCP configuration information.

Afterwards, step 502*a* is repeatedly performed.

Step 509*a*: The available DHCP relay sends a relay capability indication message to an IACP+DHCP server, where the relay capability indication message carries capability indication information and a network segment identifier.

It can be understood that after the client having the formal IP address is configured as an available DHCP relay, the client having the formal IP address is also an available DHCP relay.

Step 510*a*: After the determining device triggers the starting of the DHCP server, the DHCP server assigns, through the available DHCP relay, a formal IP address to the client to which the formal IP address is to be assigned.

Specifically, a DHCP relay exists in the network system. Therefore, the IP address can be assigned according to the normal DHCP procedure.

Step 511*a*: After the determining device triggers the starting of the DHCP server, the DHCP server directly assigns a formal IP address to the client to which the formal IP address is to be assigned.

Specifically, the client to which the IP address is to be assigned and the DHCP server are on the same network segment. Therefore, the IP address can be assigned according to the normal DHCP procedure.

According to the technical solution provided in the embodiment, the client having the formal IP address configures itself as a DHCP relay; when DHCP is used to configure the IP address, a dedicated DHCP relay is not required to be set in the network system. In this way, network investment and maintenance cost are reduced.

Further, in the embodiment, the network segment identifier is used when relevant determination is performed, which may be applicable to the scenario where the VLAN is not planned in the network system.

In addition, in the embodiment, a probe packet in an IACP procedure carries the address of the IACP server and the address of the DHCP server, which may be applicable to the scenario where the DHCP function and the IACP function are set in different physical entities.

Figure 14A:
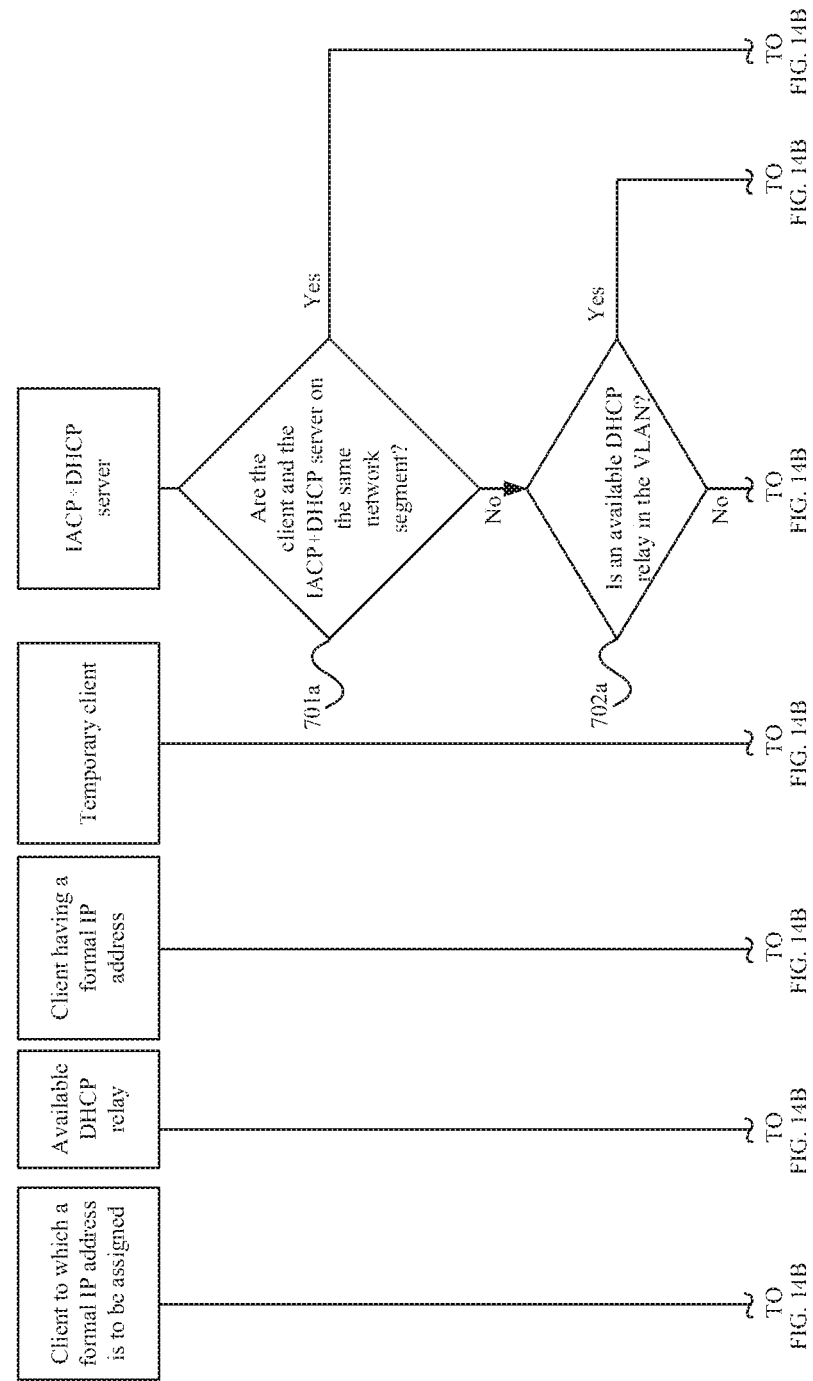
Figure 14C:
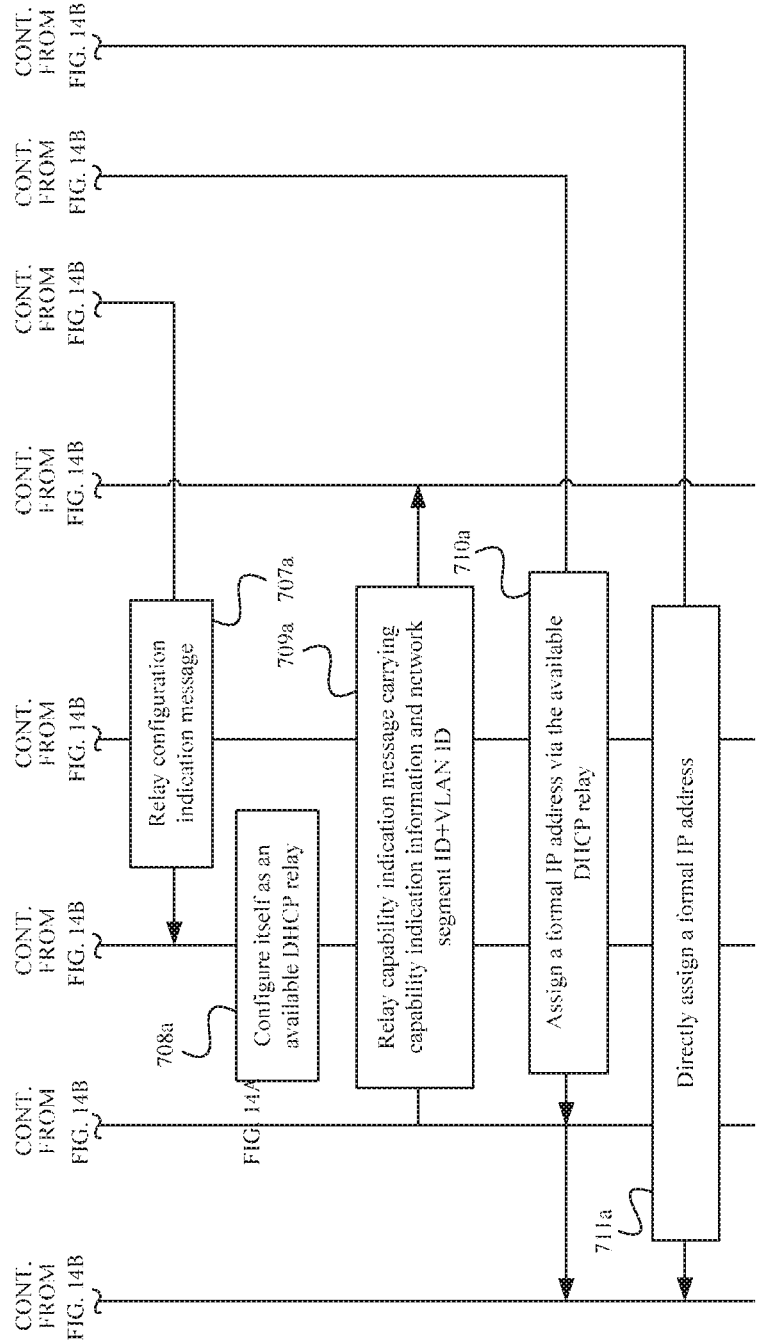

FIG. 14A, FIG. 14B, and FIG. 14C are a schematic flowchart of a method according to an embodiment of the present invention. The embodiment uses the scenario where the VLAN is planned and the IACP function and the DHCP function are set in the same physical entity as an example for illustration.

Figure 15:
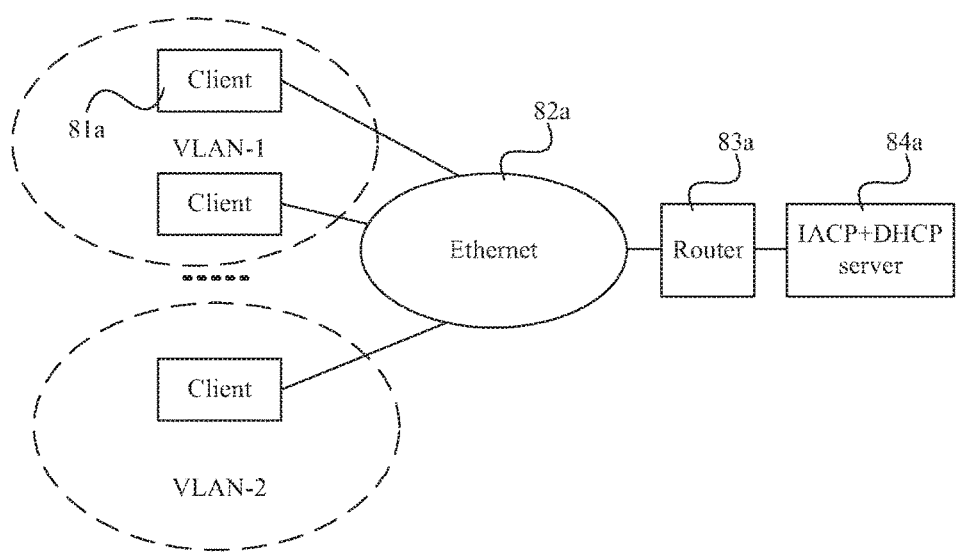
FIG. 15 is a schematic structural diagram of a network system according to an embodiment of the present invention.

FIG. 15 is a schematic structural diagram of a network system according to an embodiment of the present invention. Referring to FIG. 15, the system includes at least one client 81a. In a case that multiple clients 81a exist, it is assumed that the multiple clients 81a are configured in different VLANs. The client 81a communicates with an IACP+DHCP server 84a through an Ethernet (Ethernet) 82a and a router 83a. The IACP+DHCP server 84a may have the IACP function and the DHCP function. According to the embodiment, a DHCP relay needs to be configured in the VLAN of a network segment to which a client belongs, where a formal IP address is to be assigned to the client.

In the embodiment, unless otherwise specified, a VLAN refers to a VLAN of a network segment to which a client belongs, where a formal IP address is to be assigned to the client.

Referring to FIG. 14A, FIG. 14B, and FIG. 14C, the embodiment includes the following steps:

Step 701a: After being started, an IACP+DHCP server determines whether the IACP+DHCP server and the client to which a formal IP address is to be assigned are on the same network segment; if they are on the same network segment, step 711a is performed; otherwise, step 702a is performed.

The IACP+DHCP server stores related information about the client, where the related information includes the network segment identifier of the network segment to which the client belongs. Therefore, the IACP+DHCP server may determine whether the IACP+DHCP server and the client are on the same network segment, where the formal IP address is to be assigned to the client.

Step 702a: The IACP+DHCP server determines whether an available DHCP relay exists in the VLAN of the network segment to which the client belongs, where the formal IP address is to be assigned to the client; if an available DHCP relay exists, step 710a is performed; otherwise, step 703a is performed.

Specifically, in the network system, a client having a formal IP address may send a relay capability indication message to the IACP+DHCP server, where the relay capability indication message carries a network segment identifier and a VLAN identifier (network segment identifier+VLAN identifier), and capability indication information.

Therefore, the IACP+DHCP server may determine whether an available DHCP relay exists in the VLAN by using the following mode:

When the IACP+DHCP server receives the relay capability indication message that is sent by the client and carries the capability indication information and the network segment identifier+VLAN identifier, where the capability indication information indicates that the client sending the relay capability indication message has relay capability, and the network segment identifier+VLAN identifier indicate that the client sending the formal IP address indication message and the client to be configured with the formal IP address are in the same VLAN, the IACP+DHCP server determines that an available DHCP relay exists in the VLAN. It can be understood that, the "available DHCP relay" may be a DHCP relay obtained by configuring a client having a formal IP address or may be a dedicated DHCP relay according to the prior art.

When the IACP+DHCP server does not receive the relay capability indication message, or receives the relay capability indication message but the capability indication information indicates that the client sending the relay capability indication message does not have DHCP relay capability, or receives the relay capability indication message but the network segment identifier+VLAN identifier indicate that the client sending the formal IP address indication message and the client to be configured with the formal IP address are not in the same VLAN, the IACP+DHCP server determines that no available DHCP relay exists in the VLAN.

Step 703a: The IACP+DHCP server determines whether a client having a formal IP address exists in the VLAN; if a client having a formal IP address exists in the VLAN, step 707a is performed; otherwise, step 704a is performed.

Specifically, in the network system, after the client is started, a client configured with a formal IP address (for example, in manual configuration mode or DHCP configuration mode) may send the formal IP address indication message to the IACP+DHCP server, where the formal IP address indication message carries the network segment identifier+VLAN identifier.

Therefore, the IACP+DHCP server may determine whether a client having a formal IP address exists on the network segment by using the following mode:

When the IACP+DHCP server receives the formal IP address indication message that is sent by the client and carries the network segment identifier+VLAN identifier, and the network segment identifier+VLAN identifier indicate that the client sending the formal IP address indication message and the client to be configured with a formal IP address are in the same VLAN, the IACP+DHCP server determines that a client configured with a formal IP address exists in the VLAN.

When the IACP+DHCP server does not receive the formal IP address indication message, or receives the formal IP address indication message but the network segment identifier+VLAN identifier indicate that the client sending the formal IP address indication message and the client to be configured with the formal IP address are not in the same VLAN, the IACP+DHCP server determines that no client configured with a formal IP address exists in the VLAN.

Step 704a: The IACP+DHCP server assigns a temporary IP address to a temporary client in the VLAN by using IACP.

Specifically, an implementation procedure similar to step 304a may be used. Different from step 304a, the network segment in step 304a needs to be replaced with the VLAN to which the client belongs, where the formal IP address is to be assigned to the client. Step 705a: The temporary client obtains a formal IP address from the IACP+DHCP server by using a unicast DHCP procedure according to a temporary IP address, an IP address of a gateway, a subnet mask, and an IP address of the IACP+DHCP server in a probe packet.

Specifically, an implementation procedure similar to step 305a may be used. Different from step 305a, the network segment in step 305a needs to be replaced with the VLAN to which the client belongs, where the formal IP address is to be assigned to the client.

Step 706a: The client having the formal IP address sends a formal IP address indication message to the IACP+DHCP server, where the formal IP address indication message carries the network segment identifier+VLAN identifier.

Afterwards, step 703a is repeatedly performed.

It can be understood that after a temporary client obtains a formal IP address, the temporary client is also the client having the formal IP address.

Step 707a: The step is the same as step 307a.

Step 708a: The client having the formal IP address configures itself as an available DHCP relay according to the DHCP configuration information.

Afterwards, step 702a is repeatedly performed.

Step 709a: The available DHCP relay sends a relay capability indication message to the IACP+DHCP server, where the relay capability indication message carries the capability indication information and the network segment identifier+VLAN identifier.

It can be understood that after the client having the formal IP address is configured as an available DHCP relay, the client having the formal IP address is also an available DHCP relay.

Step 710a: The step is the same as step 310a.

Step 711a: The IACP+DHCP server directly assigns a formal IP address to the client that is to be configured with the formal IP address.

Specifically, the client to be configured with the IP address and the IACP+DHCP server are in the same VLAN of the same network segment. Therefore, the IP address can be assigned according to a normal DHCP procedure.

According to the technical solution provided in the embodiment, the client having the formal IP address configures itself as a DHCP relay; when DHCP is used to configure the IP address, a dedicated DHCP relay is not required to be set in the network system. In this way, network investment and maintenance cost are reduced.

Further, in the embodiment, the network segment identifier+VLAN identifier are used when relevant determination is performed, which may be applicable to the scenario where the VLAN is planned in the network system.

In addition, in the embodiment, a probe packet in an IACP procedure carries the address of the IACP+DHCP server, which may be applicable to the scenario where the DHCP function and the IACP function are integrated in the same physical entity.

Figure 16A:
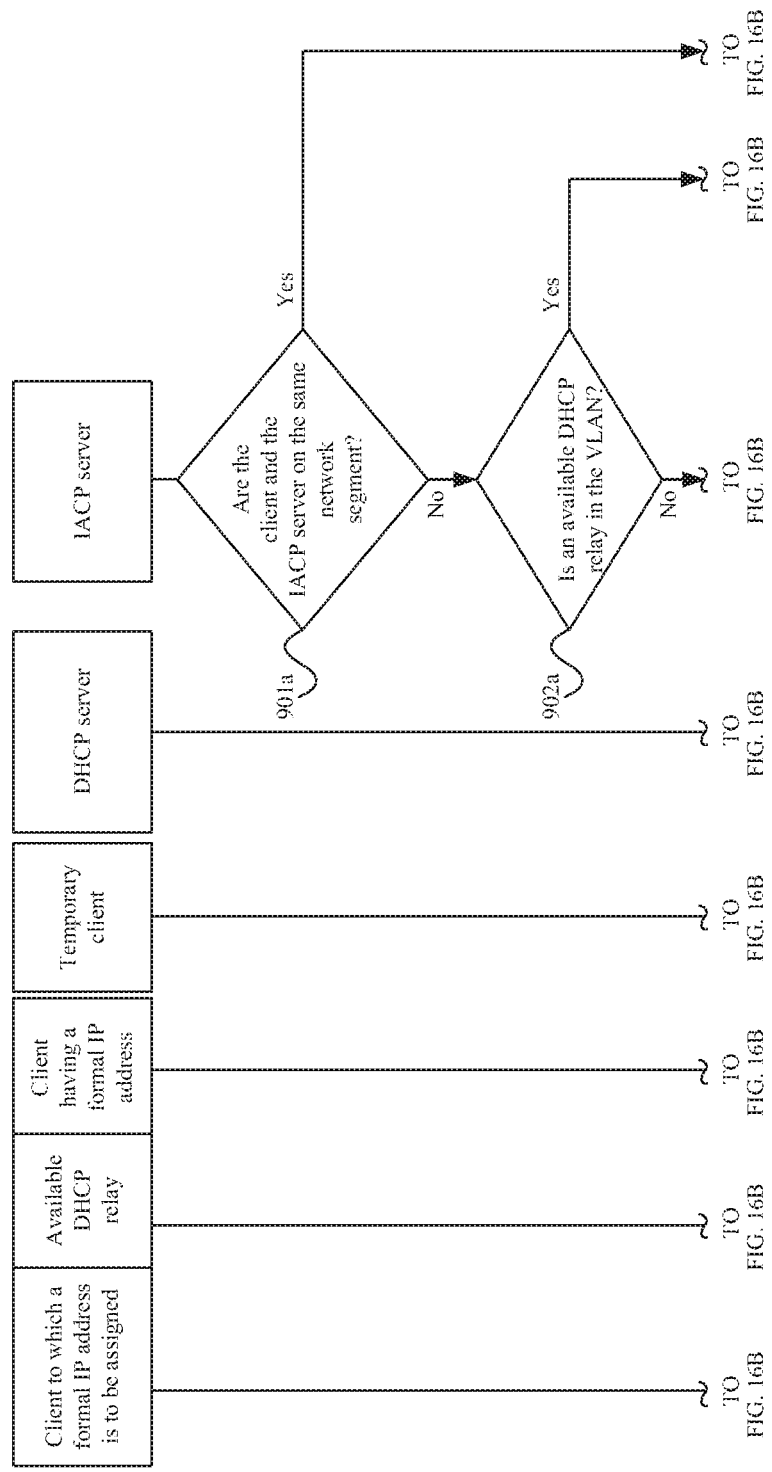
FIG. 16A, FIG. 16B, and FIG. 16C are a schematic flowchart of a method according to an embodiment of the present invention.
Figure 16B:
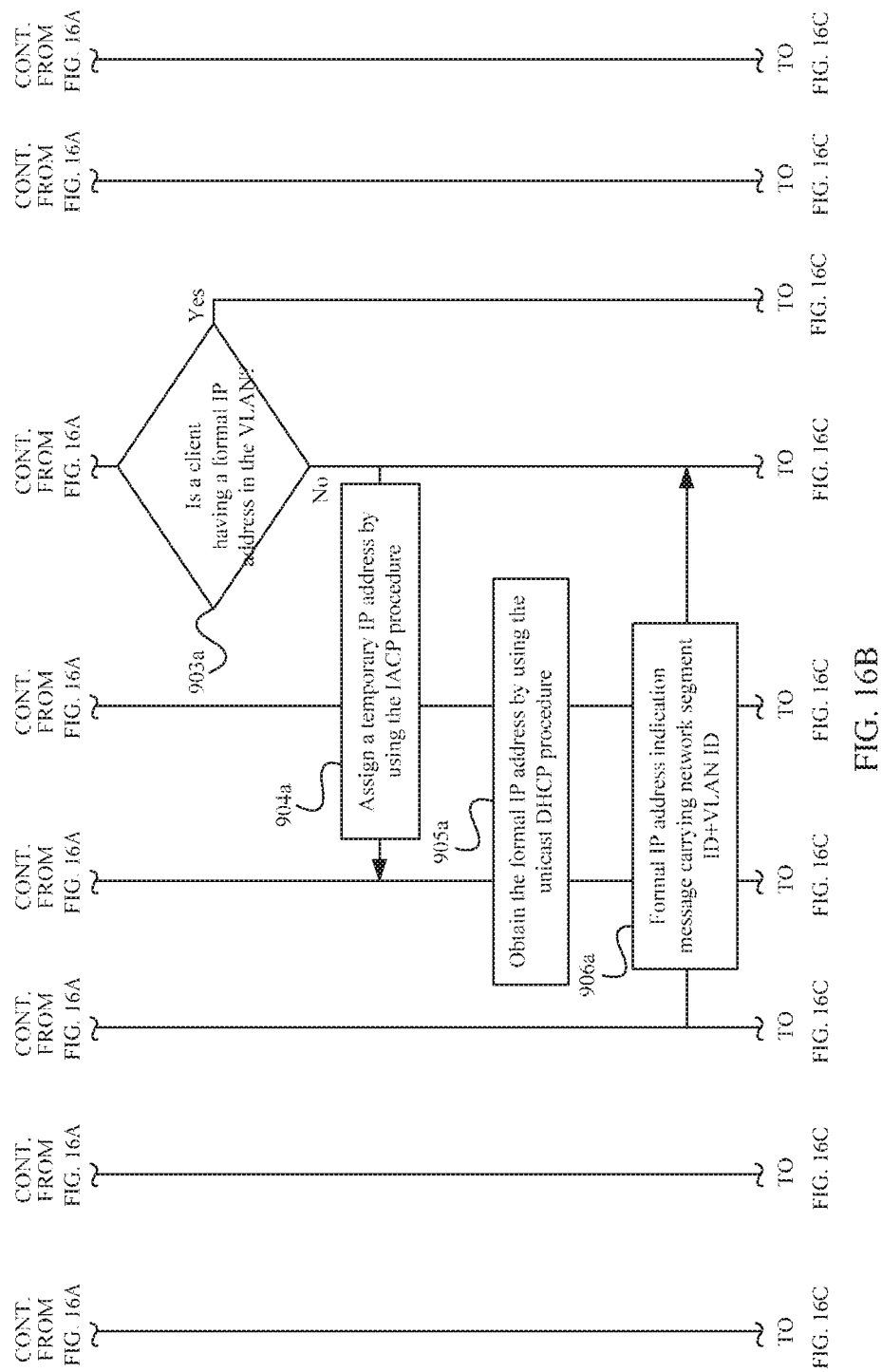
Figure 16C:
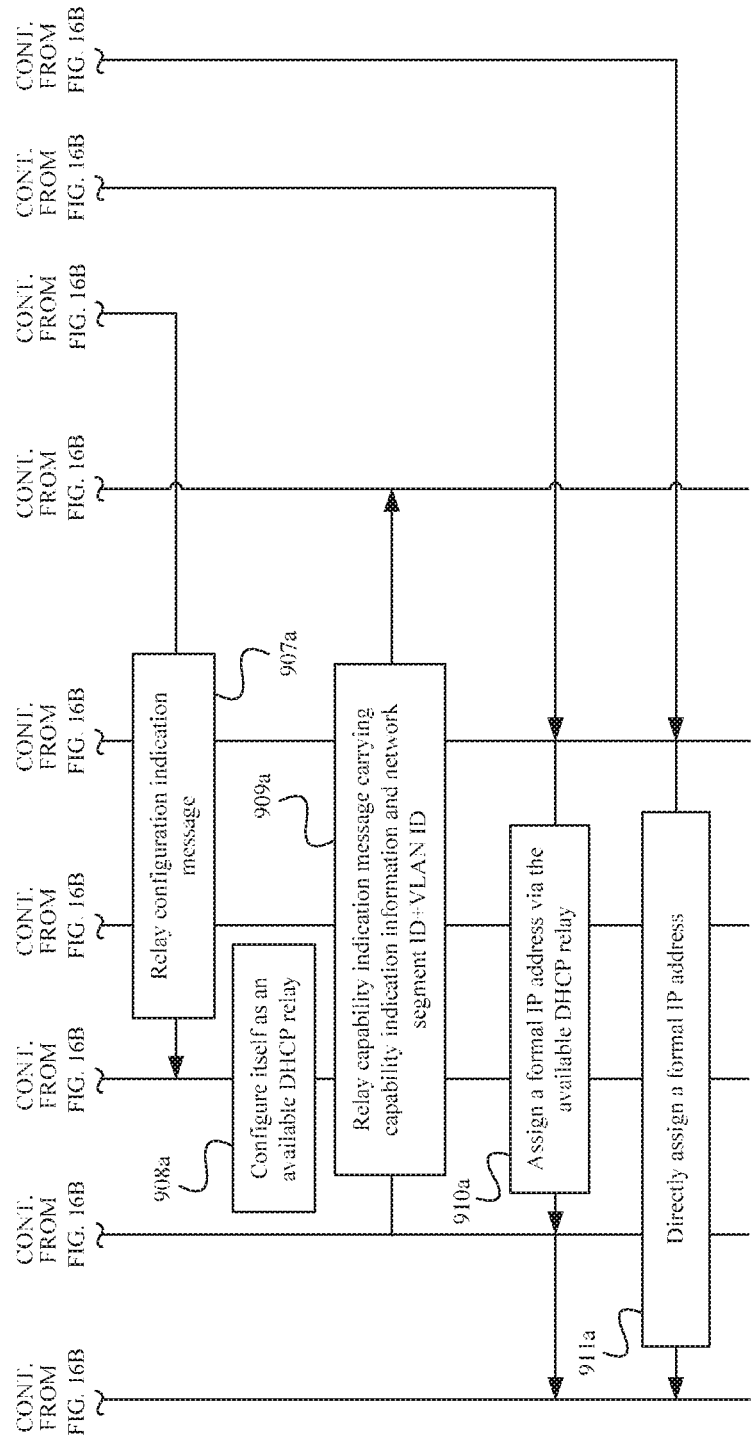
Figure 17:
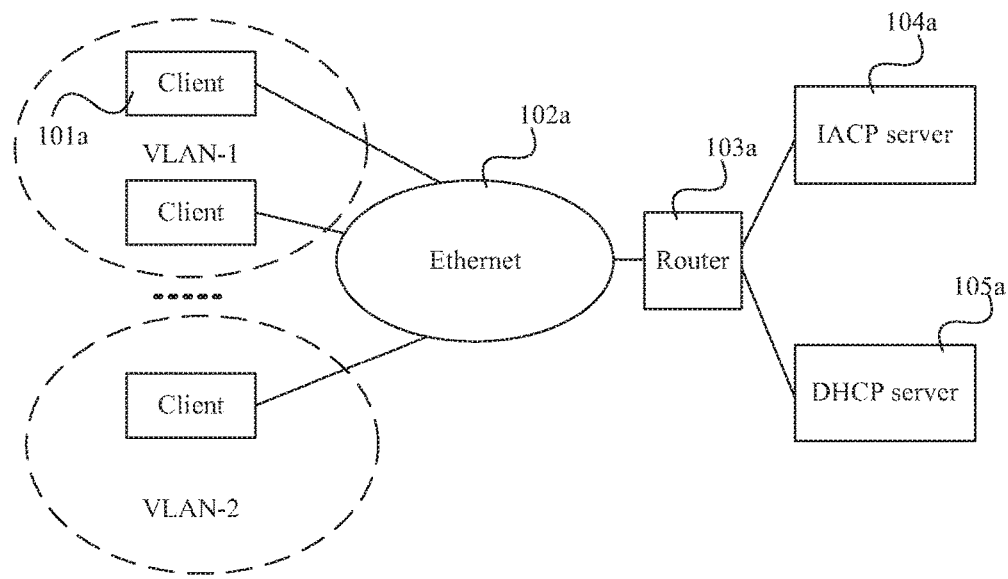
FIG. 17 is a schematic structural diagram of a network system according to an embodiment of the present invention.

FIG. 16A, FIG. 16B, and FIG. 16C are a schematic flowchart of a method according to an embodiment of the present invention. The embodiment uses the scenario where the VLAN is planned and the IACP function and the DHCP function are set in different physical entities as an example for illustration.

FIG. 10a is a schematic structural diagram of a network system according to an embodiment of the present invention. Referring to FIG. 10a, the system includes at least one client 101a. The client 101a communicates with an IACP server 104a and a DHCP server 105a through an Ethernet (Ethernet) 102a or further through a gateway 103a. The IACP server 104a has the IACP function and the DHCP server 105a has the DHCP function. According to the embodiment, a DHCP relay needs to be configured on a network segment to which a client belongs, where a formal IP address is to be assigned to the client.

In the embodiment, unless otherwise specified, a VLAN refers to a VLAN of a network segment to which a client belongs, where a formal IP address is to be assigned to the client.

Referring to FIG. 16A, FIG. 16B, and FIG. 16C, the embodiment includes the following steps:

Step S901a: After a DHCP server is started, a determining device determines whether a DHCP server and a client to which a formal IP address is to be assigned are on the same network segment; if they are on the same network segment, step 911a is performed; otherwise, step 902a is performed.

The determining device is a function module in the server, and may be located in an IACP server, or a DHCP server, or set independently outside of an IACP server and a DHCP server.

The determining device stores related information about the client, where the related information includes the network segment identifier of a network segment to which the client belongs. Therefore, the determining device may determine whether the DHCP server and the client to which the formal IP address is to be assigned are on the same network segment.

Step 902a: The determining device determines whether an available DHCP relay exists in a VLAN of a network segment to which the client belongs, where the formal IP address is to be assigned to the client; if an available DHCP relay exists, step 910a is performed; otherwise, step 903a is performed.

Specifically, in the network system, a client having a formal IP address may send a relay capability indication message to the determining device, where the relay capability indication message carries a network segment identifier+VLAN identifier, and capability indication information.

Therefore, the determining device may determine whether an available DHCP relay exists on the network segment by using the following mode:

When the determining device receives the relay capability indication message that is sent by the client and carries the capability indication information and the network segment identifier+VLAN identifier, where the capability indication information indicates that the client sending the relay capability indication message has relay capability, and the network segment identifier+VLAN identifier indicate that the client sending the formal IP address indication message and the client to be configured with a formal IP address are in the same VLAN, the determining device determines that an available DHCP relay exists in the VLAN. It can be understood that, the "available DHCP relay" may be a DHCP relay obtained by configuring a client having a formal IP address or may be a dedicated DHCP relay according to the prior art.

When the determining device does not receive the relay capability indication message, or receives the relay capability indication message but the capability indication information indicates that the client sending the relay capability indication message does not have the relay capability, or receives the relay capability indication message but the network segment identifier+VLAN identifier indicate that the client sending the formal IP address indication message and the client to be configured with a formal IP address are not in the same VLAN, the determining device determines that no available DHCP relay exists in the VLAN.

Step 903a: The determining device determines whether a client having a formal IP address exists in the VLAN; if a client having the formal IP address exists in the VLAN, step 907a is performed; otherwise, step 904a is performed.

Specifically, in the network system, after the client is started, a client configured with a formal IP address (for example, in manual configuration mode or DHCP configuration mode) may send a formal IP address indication message to the determining device, where the formal IP address indication message carries the network segment identifier+VLAN identifier.

Therefore, the determining device may determine whether a client having a formal IP address exists on the network segment by using the following mode:

When the determining device receives the formal IP address indication message that is sent by the client and carries the network segment identifier+VLAN identifier, and the network segment identifier+VLAN identifier indicate that the client sending the formal IP address indication message and the client to be configured with a formal IP address are in the same VLAN, the determining device determines that a client configured with a formal IP address exists in the VLAN.

When the determining device does not receive the formal IP address indication message, or receives the formal IP address indication message but the network segment identifier+VLAN identifier indicate that the client sending the formal IP address indication message and the client to be configured with a formal IP address are not in the same VLAN, the determining device determines that no client configured with a formal IP address exists in the VLAN.

Step 904a: After the determining device triggers the starting of the IACP server, the IACP server assigns a temporary IP address to a temporary client in the VLAN by using IACP.

Specifically, an implementation procedure similar to step 504a may be used. Different from step 504a, the network segment in step 504a needs to be replaced with the VLAN to which the client belongs, where the formal IP address is to be assigned to the client.

Step 905a: The temporary client obtains a formal IP address from the DHCP server by using a unicast DHCP procedure according to a temporary IP address, an IP address of a gateway, a subnet mask, and an IP address of the DHCP server in a probe packet.

Specifically, an implementation procedure similar to step 505a may be used. Different from step 505a, the network segment in step 505a needs to be replaced with the VLAN to which the client belongs, where the formal IP address is to be assigned to the client.

Step 906a: The client having the formal IP address sends a formal IP address indication message to the determining device, where the formal IP address indication message carries the network segment identifier.

Afterwards, step 803a is repeatedly performed.

It can be understood that after a temporary client obtains a formal IP address, the temporary client is also the client having the formal IP address.

Step 907a: The step is the same as step 507a.

Step 908a: The client having the formal IP address configures itself as an available DHCP relay according to the DHCP configuration information.

Afterwards, step 902a is repeatedly performed.

Step 909a: The available DHCP relay sends a relay capability indication message to the IACP+DHCP server, where the relay capability indication message carries the capability indication information and the network segment identifier+VLAN identifier.

It can be understood that after the client having the formal IP address is configured as an available DHCP relay, the client having the formal IP address is also an available DHCP relay.

Step 910a: The step is the same as step 510a.

Step 911a: The IACP+DHCP server directly assigns a formal IP address to the client that is to be configured with a formal IP address.

Specifically, the client to be configured with a IP address and the IACP+DHCP server are in the same VLAN of the same network segment. Therefore, the IP address can be assigned according to a normal DHCP procedure. According to the technical solution provided in the embodiment, the client having the formal IP address configures itself as a DHCP relay; when DHCP is used to configure the IP address, a dedicated DHCP relay is not required to be set in the network system. In this way, network investment and maintenance cost are reduced.

Further, in the embodiment, the network segment identifier+VLAN identifier are used when relevant determination is performed, which may be applicable to the scenario where the VLAN is planned in the network system.

In addition, in the embodiment, a probe packet in an IACP procedure carries the address of the IACP server and the address of the DHCP server, which may be applicable to the scenario where the DHCP function and the IACP function are set in different physical entities.

Figure 18:
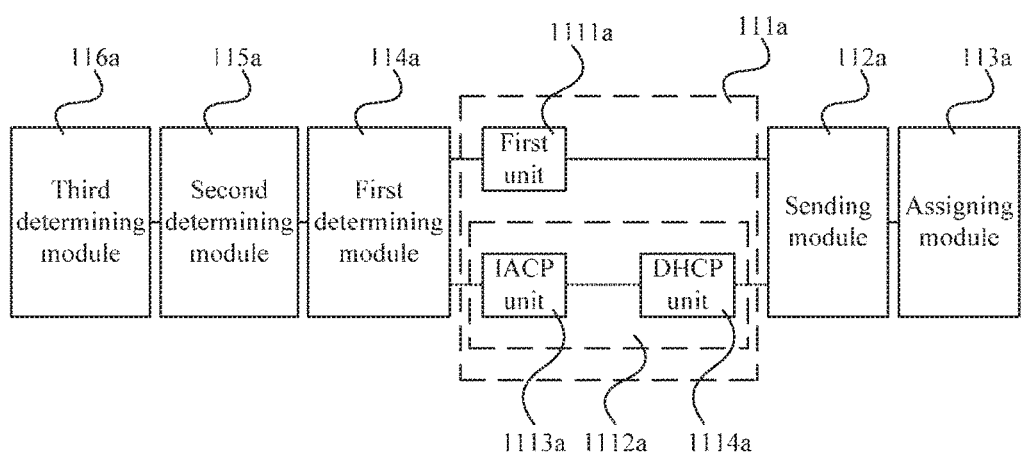
FIG. 18 is a schematic structural diagram of a server according to an embodiment of the present invention.

FIG. 18 is a schematic structural diagram of a server according to an embodiment of the present invention. The server includes a client determining module 111a, a sending module 112a, and an assigning module 113a.

The client determining module 111a is configured to determine a client having a formal IP address which is a configured IP address, within a communication range to which a client to be configured with a formal IP address belongs. The sending module 112a is configured to send a relay configuration indication message to the client having the formal IP address determined by the client determining module 111a, where the relay configuration indication message carries DHCP configuration information. The assigning module 113a is configured to, after the client having the formal IP address configures itself as a DHCP relay according to the DHCP configuration information, assign a formal IP address to the client to be configured with the formal IP address through the client that is configured as the DHCP relay.

Further, the embodiment may further include a first determining module 114a. The first determining module 114a is configured to determine whether a client configured with a formal IP address exists within the communication range.

The client determining module 111a may include a first unit 1111a and/or a second unit 1112a unit. The first unit 1111a is configured to, when the first determining module 114a determines that the client configured with the formal IP address exists within the communication range, receive a formal IP address indication message sent by the client configured with the formal IP address, and determine the client sending the formal IP address indication message as the client having the formal IP address. The second unit 1112a is configured to, when the first determining module 1111a determines that no client configured with the formal IP address exists within the communication range, assign a temporary IP address, and configure the client, to which the temporary IP address is assigned, as the client having the formal IP address.

Specifically, the second unit 1112a may include an IACP unit 1113a and a DHCP unit 1114a. The IACP unit 1113a is configured to send a probe packet within the communication range, the probe packet carrying a temporary IP address, an IP address of a gateway within the communication range, an IP address of a server, and a subnet mask within the communication range, where the temporary IP address is configured for a temporary client negotiated and determined by clients within the communication range. The DHCP unit 1114a is configured to receive a unicast DHCP request sent by the temporary client, assign a formal IP address to the temporary client according to the unicast DHCP request, and determine the temporary client, to which the formal IP address is assigned, as the client having the formal IP address, where the unicast DHCP request is sent by the temporary client according to the temporary IP address, the IP address of the gateway within the communication range, the IP address of the server, and the subnet mask within the communication range.

The IACP unit 1113a and the DHCP unit 1114a may be located in the same physical entity. In this case, the IP address of the server sent by the IACP unit 1113a is the IP address of the physical entity. Alternatively, the IACP unit 1113a and the DHCP unit 1114a may also be located in different physical entities. In this case, the IP address of the server sent by the IACP unit 1113a includes the IP address of the physical entity to which the IACP unit 1113a belongs and the IP address of the physical entity to which the DHCP unit 1114a belongs.

Further, the embodiment may further include a second determining module 115a. The second determining module 115a is configured to determine whether an available DHCP relay exists within the communication range. The first determining module 114a is specifically configured to determine whether a client configured with a formal IP address exists within the communication range, when the second determining module 115a determines that no available DHCP relay exists within the communication range. Further, the embodiment may further include a third determining module 116a. The third determining module 116a is configured to determine whether the server and the client to be configured with a formal IP address are on the same network segment. The second determining module 115a is specifically configured to determine whether an available DHCP relay exists within the communication range, when the third determining module 116a determines that the server and the client to be configured with the formal IP address are not on the same network segment.

According to the embodiment, the client having the formal IP address configures itself as a DHCP relay; when DHCP is used to configure the IP address, a dedicated DHCP relay is not required to be set in a network system. In this way, network investment and maintenance cost are reduced. During an IACP procedure according to the embodiment, a probe packet carries the address(es) of the physical entity (ies) to which the IACP unit and the DHCP unit belong, which may be applicable to the scenario where the DHCP function and the IACP function are integrated in the same physical entity or are set in different physical entities.

Figure 19:
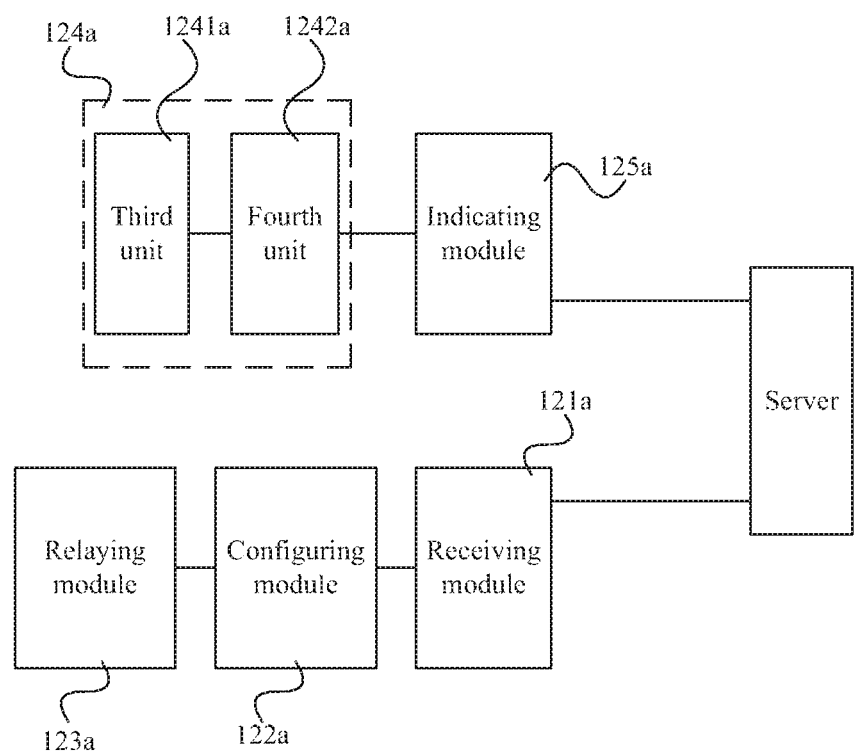
FIG. 19 is a schematic structural diagram of a client according to an embodiment of the present invention.

FIG. 19 is a schematic structural diagram of a client according to an embodiment of the present invention. The client includes a receiving module 121a, a configuring module 122a, and a relaying module 123a.

The receiving module 121a is configured to receive a relay configuration indication message sent by a server, where the relay configuration indication message carries DHCP configuration information. The configuring module 122a is configured to configure the client as a DHCP relay according to the DHCP configuration information carried in the relay configuration indication message received by the receiving module 121a. The relaying module 123a is configured to provide a DHCP relay function, to implement that the server assigns a formal IP address to a client that is to be configured with a formal IP address.

Further, the embodiment may further include an address obtaining module 124a and an indicating module 125a. The address obtaining module 124a is configured to obtain a formal IP address. The indicating module 125a is configured to send a formal IP address indication message to the server after the address obtaining module 124a obtains the formal IP address, where the relay configuration indication message is sent by the server after the server receives the formal IP address indication message.

The address obtaining module 124a may include a third unit 1241a and a fourth unit 1242a. The third unit 1241a is configured to receive a probe packet sent by the server, where the probe packet carries a temporary IP address, an IP address of a gateway within a communication range, an IP address of the server, and a subnet mask within the communication range. The fourth unit 1242a is configured to send, according to the temporary IP address, the IP address of the gateway within the communication range, the IP address of the server, and the subnet mask within the communication range carried in the probe packet received by the third unit 1241a, a unicast DHCP request to the server and receive a formal IP address that is assigned according to the unicast DHCP request by the server.

The client sends, to the server, relevant determination information carrying a network segment identifier, or a network segment identifier and VLAN identifier. That is, when the VLAN is not planned, it is required to determine whether the client according to the embodiment and the client to be configured with a formal IP address are on the same network segment; when the VLAN is planned, it is required to determine whether the client according to the embodiment and the client to be configured with a formal IP address are in the same VLAN of the same network segment.

According to the embodiment, the client having the formal IP address configures itself as a DHCP relay; when DHCP is used to configure the IP address, a dedicated DHCP relay is not required to be set in a network system. In this way, network investment and maintenance cost are reduced. According to the embodiment, the network segment identifier, or the network segment identifier and VLAN identifier is used when relevant determination is performed, which may be applicable to the scenario where the VLAN is not planned in the network system or the scenario where the VLAN is planned in the network system.

Figure 20:
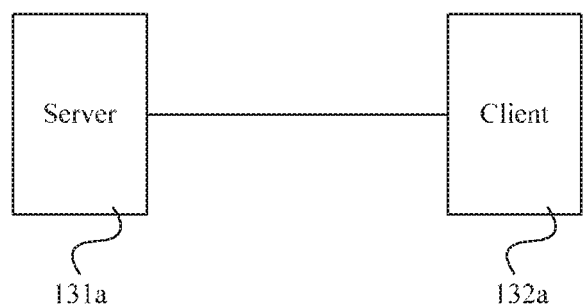
FIG. 20 is a schematic structural diagram of a communication system according to an embodiment of the present invention.

FIG. 20 is a schematic structural diagram of a communication system according to an embodiment of the present invention. The communication system includes a server 131a and a client 132a, where the server 131a can be shown in FIG. 18 and the client 132a can be shown in FIG. 19. In addition, for detailed description of the server and the client, reference may be made to the relevant device embodiment and/or method embodiment.

In addition, detailed description of the server and the client, reference may also be made to the relevant method embodiment. That is, the device provided in the device embodiment can implement the procedures or functions in the method embodiment.

According to the embodiment, the client having the formal IP address configures itself as a DHCP relay; when DHCP is used to configure the IP address, a dedicated DHCP relay is not required to be set in a network system. In this way, network investment and maintenance cost are reduced. According to the embodiment, the network segment identifier, or the network segment identifier and VLAN identifier is used when relevant determination is performed, which may be applicable to the scenario where the VLAN is not planned in the network system or the scenario where the VLAN is planned in the network system.

Persons of ordinary skill in the art may understand that all or part of steps according to the method embodiments may be implemented by a program instructing relevant hardware. The programs may be stored in a computer readable storage medium. When the program is executed, the steps of the method embodiments are executed. The storage medium may be any medium capable of storing program codes, such as a ROM, a RAM, a magnetic disk, and a CD-ROM.

Finally, it should be noted that the above embodiments are intended to describe the technical solutions of the present invention only, but not intended to impose a limitation on the technical solution of the present invention. Although the present invention is described in detail with reference to the exemplary embodiments, persons of ordinary skill in the art should understand that various modifications to the technical solutions disclosed in the above embodiments or equivalent replacements for a part of technical features contained therein can be made according to the embodiments of the present invention. Such modifications and equivalent replacements cannot make the essence of the corresponding technical solutions depart from the scope of the technical solutions of the embodiments of the present invention.

What is claimed is:

1. A first Internet Protocol (IP) client, comprising:
a processor; and
a non-transitory computer readable storage medium storing programming for execution by the processor when the first IP client is located inside a network segment without an assigned IP address, the programming including instructions for the first IP client to:
receive an IP packet containing an unassigned IP address, the unassigned IP address being provided to the network segment by an IP address assignment server located inside or outside the network segment where the first IP client is located, the IP address assignment server being distinctly separate from the first IP client;
probe, before obtaining the unassigned IP address from the IP address assignment server, into whether the unassigned IP address in the IP packet is otherwise occupied in the network segment by sending a probe message containing the unassigned IP address to a second IP client in the network segment where the first IP client is located, and determining, according to a response message returned by the second IP client, whether the unassigned IP address is occupied by the second IP client, the second IP client being distinctly separate from the first IP client and distinctly separate from the IP address assignment server;
receive a free address resolution protocol (ARP) request packet sent by the second IP client;
elect itself over the second IP client as an IP client allowed to obtain the unassigned IP address, according to comparison information borne in the free ARP request, when the first IP client is the IP client with a minimum or maximum Ethernet MAC address value in the network segment, in comparison to an Ethernet MAC address value of the second IP client; and
send an acknowledgement message to the IP address assignment server when the first IP client is allowed to obtain the unassigned IP address, the acknowledgement message indicating that the unassigned IP address in the IP packet has been assigned to the first IP client.

2. The first IP client according to claim 1, wherein the programming further includes instructions to broadcast, on the network segment where the first IP client is located, a response message indicating that the unassigned IP address is occupied within the network segment after the first IP client obtains the unassigned IP address.

3. The first IP client according to claim 1, wherein the IP address assignment server is an IACP server distinctly separate from a DHCP server.

4. The first IP client according to claim 1, wherein the programming is functional in a Layer 2 Ethernet, without additional Layer 3 IP network functionality.

5. The first IP client according to claim 4, wherein the network segment is a local network, and the IP address assignment server is disposed in a bearer network outside the local network, wherein the bearer network is a Layer 3 IP network.

6. The first IP client according to claim 1, wherein the instructions to elect, by the first IP client, itself over the second IP client comprise instructions to elect, by the first IP client, itself as the IP client allowed to obtain the unassigned IP address, according to comparison information borne in the free ARP request, when the first IP client is the IP client with the maximum Ethernet MAC address value in the network segment, in comparison to the Ethernet MAC address value of the second IP client.

7. An Internet Protocol (IP) address assignment server, comprising:
a processor; and
a non-transitory computer readable storage medium storing programming for execution by the processor, the programming including instructions to:
generate an IP packet containing a first unassigned IP address;
send the IP packet into a network segment where the first unassigned IP address is located; and
receive an acknowledge message from a first IP client located in the network segment indicating that the first unassigned IP address is assigned to the first IP client after the first IP client receives the IP packet, and the first IP client probes into whether the first unassigned IP address is otherwise occupied in the network segment by sending a probe message containing the first unassigned IP address to a second IP client in the network segment where the first IP client is located, and determining, according to a response message returned by the second IP client, whether the first unassigned IP address is occupied by the second IP client;
wherein the second IP client is distinctly separate from the first IP client and distinctly separate from the IP address assignment server, and the first IP client is distinctly separate from the IP address assignment server;
wherein, when the IP address assignment server is located inside the network segment where the first unassigned IP address is located:
the IP packet is an address resolution protocol (ARP) request packet containing the first unassigned IP address; and
the instructions to send the IP packet into the network segment comprise instructions to send the ARP request packet to the first IP client and the second IP client; and
wherein, when the IP address assignment server is located outside the network segment where the first unassigned IP address is located:
the IP packet is a probe IP packet that includes the first unassigned IP address and a second unassigned IP address located in the network segment; and
the instructions to send the IP packet into the network segment comprise instructions to send the probe IP packet to an access router that is inside the network segment, and that generates the ARP request packet containing the first unassigned IP address, according to the probe IP packet, and sends the ARP request packet to the first IP client and the second IP client inside the network segment.

8. The IP address assignment server according to claim 7, wherein the IP address assignment server is located outside the network segment where the first IP client and the second IP client are located.

9. The IP address assignment server according to claim 7, wherein the IP address assignment server is located inside the network segment where the first IP client and the second IP client are located.

10. The IP address assignment server according to claim 7, wherein the programming further includes instructions to:
receive a response message which indicates that the first unassigned IP address is occupied and which is sent by the second IP client that obtains an assignment of the first unassigned IP address; and
send to the first IP client, according to the received response message indicating that the first unassigned IP address is occupied, a subnet mask and an IP address of a gateway on the network segment where the first unassigned IP address is located, and an IP address of the IP address assignment server.

11. The IP address assignment server according to claim 7, wherein the programming is functional in a Layer 2 Ethernet, without additional Layer 3 IP network functionality.

12. The IP address assignment server according to claim 11, wherein the network segment is a local network, and the IP address assignment server is disposed in a bearer network outside the local network, wherein the bearer network is a Layer 3 IP network.

13. The IP address assignment server according to claim 7, wherein the IP address assignment server is an IACP server distinctly separate from a DHCP server.

14. A method comprising:
receiving, by a first Internet Protocol (IP) client located inside a network segment without an assigned IP address, an IP packet containing an unassigned IP address, the unassigned IP address being provided to the network segment by an IP address assignment server located inside or outside the network segment where the first IP client is located, the IP address assignment server being distinctly separate from the first IP client;
probing, by the first IP client, before obtaining the unassigned IP address from the IP address assignment server, into whether the unassigned IP address in the IP packet is otherwise occupied in the network segment by sending a probe message containing the unassigned IP address to a second IP client on the network segment where the first IP client is located, and determining, according to a response message returned by the second IP client, whether the unassigned IP address is occupied by the second IP client, the second IP client being distinctly separate from the first IP client and distinctly separate from the IP address assignment server;
receiving, by the first IP client, a free address resolution protocol (ARP) request packet sent by the second IP client;
electing, by the first IP client, itself over the second IP client as an IP client allowed to obtain the unassigned IP address, according to comparison information borne in the free ARP request, when the first IP client is the IP client with a minimum or maximum Ethernet MAC address value in the network segment, in comparison to an Ethernet MAC address value of the second IP client; and
sending an acknowledgement message to the IP address assignment server when the first IP client is allowed to obtain the unassigned IP address, the acknowledgement message indicating that the unassigned IP address from the IP packet has been assigned to the first IP client.

15. The method according to claim 14, further comprising:
broadcasting, on the network segment where the first IP client is located, a response message indicating that the unassigned IP address is occupied, after the first IP client obtains the unassigned IP address.

16. The method according to claim 14, wherein the IP address assignment server is an IACP server distinctly separate from a DHCP server.

17. A method comprising:
generating, by an Internet Protocol (IP) address assignment server, an IP packet containing a first unassigned IP address;
sending the IP packet into a network segment where the first unassigned IP address is located
receiving an acknowledge message from a second IP client located in the network segment indicating that the first unassigned IP address is assigned to the second IP client after the second IP client receives the IP packet, and the second IP client probes into whether the first unassigned IP address is otherwise occupied by sending a probe message containing the first unassigned IP address to a third IP client in the network segment where the second IP client is located, and determining, according to a response message returned by the third IP client, whether the first unassigned IP address is occupied by the third IP client;
wherein the third IP client being distinctly separate from the second IP client and the IP address assignment server, and the second IP client is distinctly separate from the IP address assignment server;
wherein, when the IP address assignment server is located inside the network segment where the first unassigned IP address is located: the IP packet is an address resolution protocol (ARP) request packet containing the first unassigned IP address; and the sending the IP packet comprises sending the ARP request packet to the second IP client and the third IP client; and
wherein, when the IP address assignment server is located outside the network segment where the first unassigned IP address is located: the IP packet is a probe IP packet that includes the first unassigned IP address and a second unassigned IP address located in the network segment; and the sending the IP packet comprises sending the probe IP packet to an access router that is inside the network segment, and that generates the ARP request packet containing the first unassigned IP address, according to the probe IP packet, and sends the ARP request packet to the second IP client and the third IP client inside the network segment.

18. The method according to claim 17, wherein the IP address assignment server is located outside the network segment where the second IP client and the third IP client are located.

19. The method according to claim 17, wherein the IP address assignment server is located inside the network segment where the second IP client and the third IP client are located.

20. The method according to claim 17, wherein the IP address assignment server is an IACP server distinctly separate from a DHCP server.

* * * * *